United States Patent
Chen et al.

(10) Patent No.: US 12,304,033 B2
(45) Date of Patent: May 20, 2025

(54) HANDHELD POWER TOOL

(71) Applicant: Nanjing Chervon Industry Co., Ltd., Nanjing (CN)

(72) Inventors: Shuai Chen, Nanjing (CN); Rui Xu, Nanjing (CN); Shaobo Liu, Nanjing (CN); Hongtao Ke, Nanjing (CN); Masatoshi Fukinuki, Nanjing (CN); Chao Meng, Nanjing (CN); Xiaoyong Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 7 days.

(21) Appl. No.: 18/240,515

(22) Filed: Aug. 31, 2023

(65) Prior Publication Data
US 2023/0405776 A1 Dec. 21, 2023

Related U.S. Application Data

(63) Continuation of application No. PCT/CN2022/076015, filed on Feb. 11, 2022.

(30) Foreign Application Priority Data

Mar. 31, 2021 (CN) .......................... 202110343906.3
Jun. 24, 2021 (CN) .......................... 202121412620.8
(Continued)

(51) Int. Cl.
*B25B 21/02* (2006.01)
*B25F 5/00* (2006.01)
*B25F 5/02* (2006.01)

(52) U.S. Cl.
CPC .............. *B25B 21/02* (2013.01); *B25F 5/001* (2013.01); *B25F 5/02* (2013.01)

(58) Field of Classification Search
CPC ............. B25B 21/02; B25F 5/02; B25F 5/001
See application file for complete search history.

(56) References Cited

U.S. PATENT DOCUMENTS 2,801,718 A * 8/1957 Kaman ................... B25B 21/02
173/93.5
4,631,012 A 12/1986 Eckman
(Continued)

FOREIGN PATENT DOCUMENTS

CN 202025016 U 11/2011
CN 104551096 A * 4/2015 .............. B25F 5/001
(Continued)

OTHER PUBLICATIONS

ISA/CN, International Search Report issued on PCT application No. PCT/CN2022/076015, dated Apr. 15, 2022, 3 pages.
(Continued)

*Primary Examiner* — Andrew M Tecco
*Assistant Examiner* — Nicholas E Igbokwe
(74) *Attorney, Agent, or Firm* — Greenberg Traurig, LLP

(57) ABSTRACT

A handheld power tool including a housing including a barrel and a head housing; a drive mechanism including an electric motor and a drive shaft, where the electric motor outputs power through the drive shaft; a transmission mechanism including a gear assembly; and an output mechanism including an output shaft for outputting power to the outside and at least partially disposed in the head housing; where the transmission mechanism drivingly connects the drive mechanism to the output mechanism. The barrel is formed with a first accommodation cavity and a second accommodation cavity, the electric motor is at least partially mounted in the first accommodation cavity, and the gear assembly is at least partially mounted in the second accommodation cavity.

16 Claims, 36 Drawing Sheets

(30) Foreign Application Priority Data

| | | |
|---|---|---|
| Jun. 28, 2021 | (CN) | 202110717905.0 |
| Oct. 14, 2021 | (CN) | 202111197202.6 |
| Oct. 14, 2021 | (CN) | 202111197205.X |
| Oct. 14, 2021 | (CN) | 202111198500.7 |
| Oct. 14, 2021 | (CN) | 202111198520.4 |
| Oct. 14, 2021 | (CN) | 202122483377.5 |

(56) References Cited

U.S. PATENT DOCUMENTS

| | | | | |
|---|---|---|---|---|
| 2006/0043684 | A1* | 3/2006 | Barber | A61B 17/1622 279/76 |
| 2015/0069864 | A1* | 3/2015 | Nagahama | H02K 3/522 310/50 |
| 2017/0326720 | A1* | 11/2017 | Kuroyanagi | B25F 5/021 |
| 2019/0160645 | A1* | 5/2019 | Fukinuki | B25F 5/001 |
| 2019/0283230 | A1* | 9/2019 | Sakakibara | B25B 21/00 |

FOREIGN PATENT DOCUMENTS

| | | |
|---|---|---|
| CN | 107443321 A | 12/2017 |
| CN | 111065491 A | 4/2020 |
| CN | 215148601 U | 12/2021 |
| CN | 110560717 B | 8/2024 |
| GB | 1172402 A | 11/1969 |
| GB | 1337944 A | 11/1973 |

OTHER PUBLICATIONS

ISA/CN, English translation of International Search Report issued on PCT application No. PCT/CN2022/076015, dated Apr. 15, 2022, 2 pages.

ISA/CN, Written Opinion issued on PCT application No. PCT/CN2022/076015, dated Apr. 15, 2022, 5 pages.

ISA/CN, English translation of Written Opinion issued on PCT application No. PCT/CN2022/076015, dated Apr. 15, 2022, 3 pages.

* cited by examiner

HANDHELD POWER TOOL

RELATED APPLICATION INFORMATION

This application is a continuation of International Application Number PCT/CN2022/076015, filed on Feb. 11, 2022, through which this application also claims the benefit under 35 U.S.C. § 119(a) of Chinese Patent Application No. CN 202110717905.0, filed on Jun. 28, 2021, Chinese Patent Application No. CN 202121412620.8, filed on Jun. 24, 2021, Chinese Patent Application No. CN 202110343906.3, filed on Mar. 31, 2021, Chinese Patent Application No. CN 202111198520.4, filed on Oct. 14, 2021, Chinese Patent Application No. CN 202111197205.X, filed on Oct. 14, 2021, Chinese Patent Application No. CN 202111197202.6, filed on Oct. 14, 2021, Chinese Patent Application No. CN 202111198500.7, filed on Oct. 14, 2021, and Chinese Patent Application No. CN 202122483377.5, filed on Oct. 14, 2021, which applications are incorporated herein by reference in their entireties.

TECHNICAL FIELD

The present application relates to a power tool and, in particular, to a handheld power tool.

BACKGROUND

Handheld power tools have been widely used in various fields and have the advantages of being easy to carry and lightweight to operate. The miniaturization of the handheld power tools is more conducive to improving user experience and operation convenience of the handheld power tools and is favored by users. A handheld power tool generally includes a driving module, a transmission module, an output module, and a control module. With an impact wrench as an example, the driving module, the transmission module, and the output module are drivingly connected in sequence along an axis of the driving module in a tool body. A relatively large number of structures occupy a certain size and space. Therefore, how to improve the structures of various parts of the whole machine or mating and connecting structures between the parts to further reduce an overall size and facilitate machining and manufacturing has become a technical problem expected to be solved by those skilled in the art.

SUMMARY

A handheld power tool includes a housing including a barrel and a head housing; a drive mechanism including an electric motor and a drive shaft, where the electric motor outputs power through the drive shaft; a transmission mechanism including a gear assembly; and an output mechanism including an output shaft for outputting power to the outside and at least partially disposed in the head housing. The transmission mechanism drivingly connects the drive mechanism to the output mechanism. The barrel is formed with a first accommodation cavity and a second accommodation cavity, the electric motor is at least partially mounted in the first accommodation cavity, and the gear assembly is at least partially mounted in the second accommodation cavity.

Further, a barrier is disposed in the barrel, the barrier and the barrel are integrally formed, and the first accommodation cavity and the second accommodation cavity exist on two sides of the barrier, separately.

Further, a plane where the barrier is located is perpendicular to the drive shaft, and a through hole is formed at the center of the barrier for the drive shaft to penetrate through.

Further, a first bearing mount is formed on a side of the barrier, and a front bearing of the electric motor is mounted to the first bearing mount.

Further, a second bearing mount is formed on the other side of the barrier, and a bearing of the gear assembly is mounted to the second bearing mount.

Further, the gear assembly includes an inner ring gear including a first meshing portion, a second meshing portion is formed in the barrel, and when the gear assembly is mounted to the barrel, the first meshing portion meshes with the second meshing portion.

Further, the inner ring gear and the barrel are integrally formed or mounted in a tight-fit manner.

Further, the electric motor includes a stator and a rotor and is an inrunner.

Further, a side portion of the stator protrudes and extends to form a first end portion; and the barrel is formed with a rotation stopper opposite to the first end portion.

Further, the rotation stopper is formed with a space, and the first end portion at least partially extends into the space.

Further, the rotation stopper mates with the first end portion so that the stator and the barrel are incapable of being relatively displaced in a plane perpendicular to the output shaft.

Further, the barrel is provided with multiple air vents for circulation of an airflow.

A handheld power tool includes a tool head including a barrel and a head housing; a grip to which the tool head is fixedly connected; and an output mechanism including an output shaft for outputting power to the outside and at least partially disposed in the head housing. The barrel and the head housing are in a threaded connection, and the head housing is formed with a locking structure for screwing the barrel and the head housing.

Further, the barrel is formed with an internal thread, the head housing is formed with an external thread, and the head housing partially extends into the barrel.

Further, the threaded connection is reinforced with a threadlocker.

Further, the locking structure is a boss.

Further, the boss is disposed at a front end of the head housing, and a through hole is formed at the center of the boss for the output shaft to penetrate through.

Further, the boss and the head housing are integrally formed.

Further, the locking structure is multiple recess portions circumferentially distributed on the periphery of the head housing.

Further, the multiple recess portions and the head housing are integrally formed.

Further, the locking structure is multiple protrusion portions circumferentially distributed on the periphery of the head housing.

Further, the multiple protrusion portions and the head housing are integrally formed.

Further, the barrel and the head housing are metal parts.

Further, the output mechanism further includes a rotary impact assembly including at least an impact block for impacting the output shaft.

A handheld power tool includes a tool head extending along a front and rear direction and a grip disposed on the lower side of the tool head and connected to a power supply device. The tool head includes at least a drive mechanism including an electric motor composed of a stator and a rotor, where the electric motor further includes multiple wires electrically connected to the power supply device. The tool head is formed with or fixedly connected to a wire clamping device disposed between the tool head and the grip to fix the multiple wires.

Further, the wire clamping device is formed with multiple clamping slots each having substantially the same diameter as each of the multiple wires, and each of the multiple wires is at least partially disposed in a respective one of the multiple clamping slots.

Further, the stator is wound with multiple coils, and at least two of the multiple coils are connected to one of the multiple wires.

Further, the wire clamping device further includes multiple connecting sheets for electrically connecting the multiple coils to the multiple wires.

Further, the multiple connecting sheets are electrically connected to the multiple wires through solder.

Further, the wire clamping device further includes an insulating sheet, where the multiple connecting sheets are fixedly mounted to the insulating sheet so that the multiple connecting sheets are not conductive between each other.

Further, a side surface of the stator protrudes to form a first end portion formed with an insertion slot, and the insulating sheet is disposed in the insertion slot.

Further, the tool head further includes a barrel, the electric motor is disposed in the barrel, the barrel is formed with a rotation stopper opposite to the first end portion, the rotation stopper is formed with an accommodation space, and the first end portion at least partially extends into the accommodation space.

Further, the wire clamping device is fixed to the rotation stopper in a screw fastening manner.

Further, at least part of the wire clamping device is made of an elastic material.

A handheld power tool includes a housing including at least a barrel and a rear housing; a drive mechanism including an electric motor composed of a stator and a rotor and a drive shaft for outputting power of the electric motor, where the electric motor is partially disposed in an accommodation space formed by the barrel, and the electric motor further includes a stator end cover disposed in a front and rear direction of the stator; and a stator platen, where an elastic member is disposed between the stator platen and the stator end cover and is in contact with both the stator platen and the stator end cover.

Further, an annular boss is provided on the stator end cover, and the elastic member is sleeved on the annular boss.

Further, the stator end cover is provided with multiple notches in a circumferential direction, and a projection of the multiple notches on a plane perpendicular to the drive shaft overlaps a projection of the elastic member on the plane perpendicular to the drive shaft.

Further, the elastic member is deformable into the multiple notches when undergoing elastic deformation.

Further, the elastic member is made of rubber.

Further, the stator end cover includes a stator front end cover on the front side of the stator and a stator rear end cover on the rear side of the stator; and the elastic member is in contact with both the stator platen and the stator rear end cover.

Further, a barrel boss is formed inside the barrel, and the stator front end cover is partially disposed between the stator and the barrel boss in the front and rear direction.

Further, the barrel boss abuts against the stator front end cover in the front and rear direction.

Further, the barrel boss and the barrel are integrally formed.

Further, the rear housing is fixedly mounted to the barrel by screws, and the screws penetrate through screw holes on the stator platen.

A handheld power tool includes a housing formed with an accommodation space; a drive mechanism including an electric motor composed of a stator and a rotor and a drive shaft for outputting power of the electric motor, where the electric motor is disposed in the accommodation space, and the electric motor further includes a rotor rear balance ring; a fan disposed in the accommodation space and on the rear side of the electric motor; and an elastic member disposed between the fan and the rotor rear balance ring and being in contact with both the fan and the rotor rear balance ring.

Further, the fan includes a first end portion facing the electric motor, and a front side surface of the first end portion is formed with or connected to a mounting portion for placing the elastic member.

Further, the elastic member is at least partially disposed within the mounting portion.

Further, the elastic member abuts against a side surface of the rotor rear balance ring facing the fan.

Further, multiple magnets are uniformly arranged on a surface of the rotor, and the rotor rear balance ring is disposed on the rear side of the multiple magnets in a front and rear direction.

Further, the electric motor further includes a stator rear end cover disposed on the rear side of the stator, and the rotor rear balance ring does not exceed the stator rear end cover in the front and rear direction.

Further, the elastic member is an O-shaped ring made of rubber.

Further, the electric motor is an inrunner.

A handheld power tool includes a housing formed with an accommodation space; a drive mechanism including an electric motor composed of a stator and a rotor and a drive shaft for outputting power of the electric motor, where the electric motor is disposed in the accommodation space, and the electric motor further includes a rotor front balance ring and a motor bearing; and an elastic member disposed between the motor bearing and the rotor front balance ring and being in contact with both the motor bearing and the rotor front balance ring.

Further, the motor bearing is disposed on the front side of the rotor front balance ring in a front and rear direction.

Further, the electric motor is configured to be an inrunner.

An impact screwdriver includes a housing having an accommodation space and including a first half housing and a second half housing detachably connected to each other, where the first half housing includes a first rear end plate, a first protrusion protrudes along a first direction a on part of an inner wall surface of the first rear end plate facing the accommodation space, the second half housing includes a second rear end plate, a second protrusion protrudes along the first direction a on part of an inner wall surface of the second rear end plate facing the accommodation space, the first rear end plate and the second rear end plate are spliced into a rear end plate of the housing, and the first protrusion and the second protrusion are spliced into a positioning protrusion; and an electric motor disposed in the accommodation space and including a motor shaft and a fan, where the motor shaft extends along the first direction a, the fan is sleeved on a rear end portion of the motor shaft facing the rear end plate, a positioning groove is provided on a wall surface of the fan facing the rear end plate, and the positioning protrusion is coplanar with the fan or partially accommodated in the positioning groove.

Further, the electric motor further includes a motor bearing sleeved on the motor shaft and disposed on a side of the fan facing the rear end plate; and the positioning protrusion is provided with a bearing chamber along the first direction a, and the motor bearing is disposed in the bearing chamber.

Further, the first protrusion is provided with a first half chamber having a side opening towards the second protrusion, the second protrusion is provided with a second half chamber having a side opening towards the first protrusion, and the first half chamber and the second half chamber are spliced into the bearing chamber.

Further, at least one of the first half chamber and the second half chamber includes a first accommodation portion and a second accommodation portion communicating in a step shape, where the first accommodation portion is used for accommodating an end portion of the motor shaft.

The second accommodation portion is used for accommodating the motor bearing and includes a first abutting surface and a first arc-shaped inner wall surface, the first abutting surface is perpendicular to the first direction a and used for abutting against a rear end surface of the motor bearing, the first arc-shaped inner wall surface is disposed around the first direction a and used for abutting against an outer wall surface of the motor bearing, and the first arc-shaped inner wall surface is connected to an end surface of the positioning protrusion.

Further, at least one of the first half chamber and the second half chamber includes a third accommodation portion, a fourth accommodation portion, and a fifth accommodation portion connected in sequence, where the third accommodation portion is used for accommodating an end portion of the motor shaft.

The fourth accommodation portion is used for accommodating the motor bearing and includes a second abutting surface, a second arc-shaped inner wall surface, and a third abutting surface connected in a U shape, the second abutting surface and the third abutting surface are perpendicular to the first direction a and abut against a rear end surface and a front end surface of the motor bearing, respectively, and the second arc-shaped inner wall surface is disposed around the first direction a and used for abutting against an outer wall surface of the motor bearing.

The fifth accommodation portion includes a third arc-shaped inner wall surface, and the third arc-shaped inner wall surface is connected to the third abutting surface and an end surface of the positioning protrusion.

Further, the first protrusion is provided with first hollow grooves along a radial direction, which communicate with the first half chamber.

Additionally/alternatively, the second protrusion is provided with second hollow grooves along a radial direction, which communicate with the second half chamber.

Further, multiple first hollow grooves are provided, which are arranged radially on the first protrusion; and multiple second hollow grooves are provided, which are arranged radially on the second protrusion.

Further, the second half housing is a right half housing.

Further, the housing is provided with air vents, where a projection of the air vents on a plane parallel to the first direction a at least partially overlaps a projection of the positioning protrusion on the plane parallel to the first direction a.

Further, multiple air vents are provided, which are spaced apart on the housing along a circumferential direction around the first direction a.

An impact screwdriver includes an electric motor including a motor shaft extending along a first direction a, where a front bearing is sleeved at a front end of the motor shaft; and a gearbox including a rear cover, where a protruding structure protrudes along the first direction a on the rear cover, a first through hole penetrates through the protruding structure along the first direction a, the motor shaft penetrates through the first through hole, at least part of the front bearing is disposed within the first through hole, at least part of an outer wall surface of the front bearing abuts against an inner wall surface of the first through hole, and the protruding structure is at least partially embedded into a stator of the electric motor.

Further, the gearbox includes a main shaft disposed along the first direction a, a rear end of the main shaft facing the rear cover is provided with an assembly hole along the first direction a, and an end portion of the motor shaft extends into the assembly hole.

Further, the protruding structure protrudes towards the electric motor, a front end of the front bearing is disposed within the assembly hole, and an outer wall surface of the front end of the front bearing abuts against an inner wall surface of the assembly hole.

A rear end of the front bearing is disposed within the first through hole, and an outer wall surface of the rear end of the front bearing abuts against the inner wall surface of the first through hole.

Further, the protruding structure protrudes away from the electric motor, the protruding structure is inserted into the assembly hole, and the front bearing is disposed within the first through hole.

Further, the gearbox further includes a main shaft lower bearing.

A bearing mounting groove is circumferentially provided on an outer wall surface of the main shaft, and the main shaft lower bearing is disposed within the bearing mounting groove.

Further, a projection of the main shaft lower bearing on a plane parallel to the first direction a at least partially overlaps a projection of the front bearing on the plane parallel to the first direction a.

Further, the bearings are embedded into the stator of the electric motor.

Further, the gearbox further includes planet gears, the main shaft includes a body portion and a ring-shaped protrusion portion connected in a stepped column shape, the body portion is provided with pin shaft holes, and pin shafts of the planet gears penetrate through the pin shaft holes.

Further, the ring-shaped protrusion portion is provided with avoidance grooves for avoiding the pin shafts, where each of the avoidance grooves communicates with part of a respective one of the pin shaft holes.

Further, the motor shaft is an integral shaft formed with a drive gear.

DETAILED DESCRIPTION

The present application is described below in detail in conjunction with the drawings.

Figure 1:
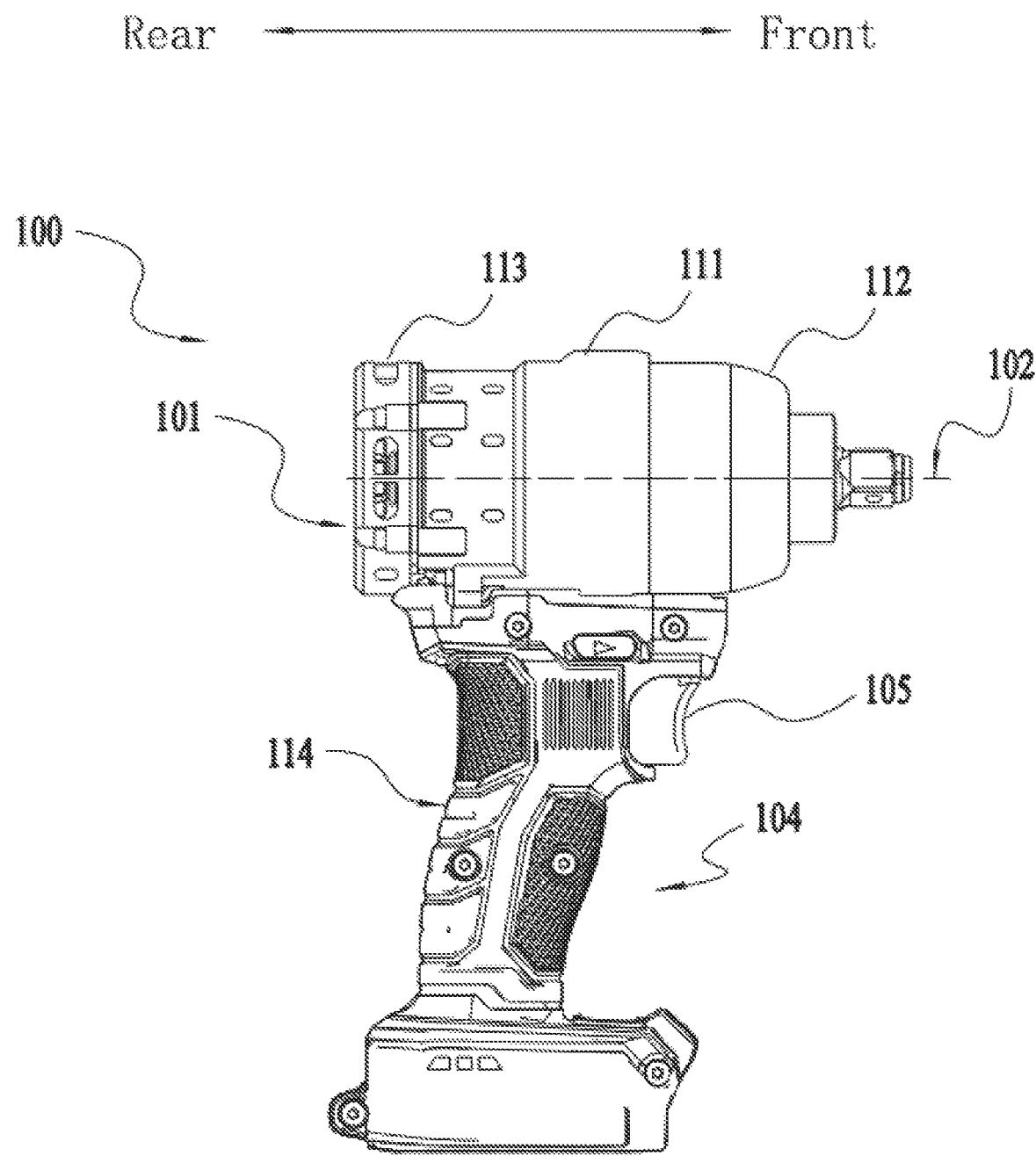
FIG. 1 is a side view of a handheld power tool of the present application.

As shown in FIG. 1, a power tool 100 of the present application is specifically a handheld power tool, which is an impact wrench in an example of the present application or may be an impact screwdriver or an electric drill.

Figure 2:
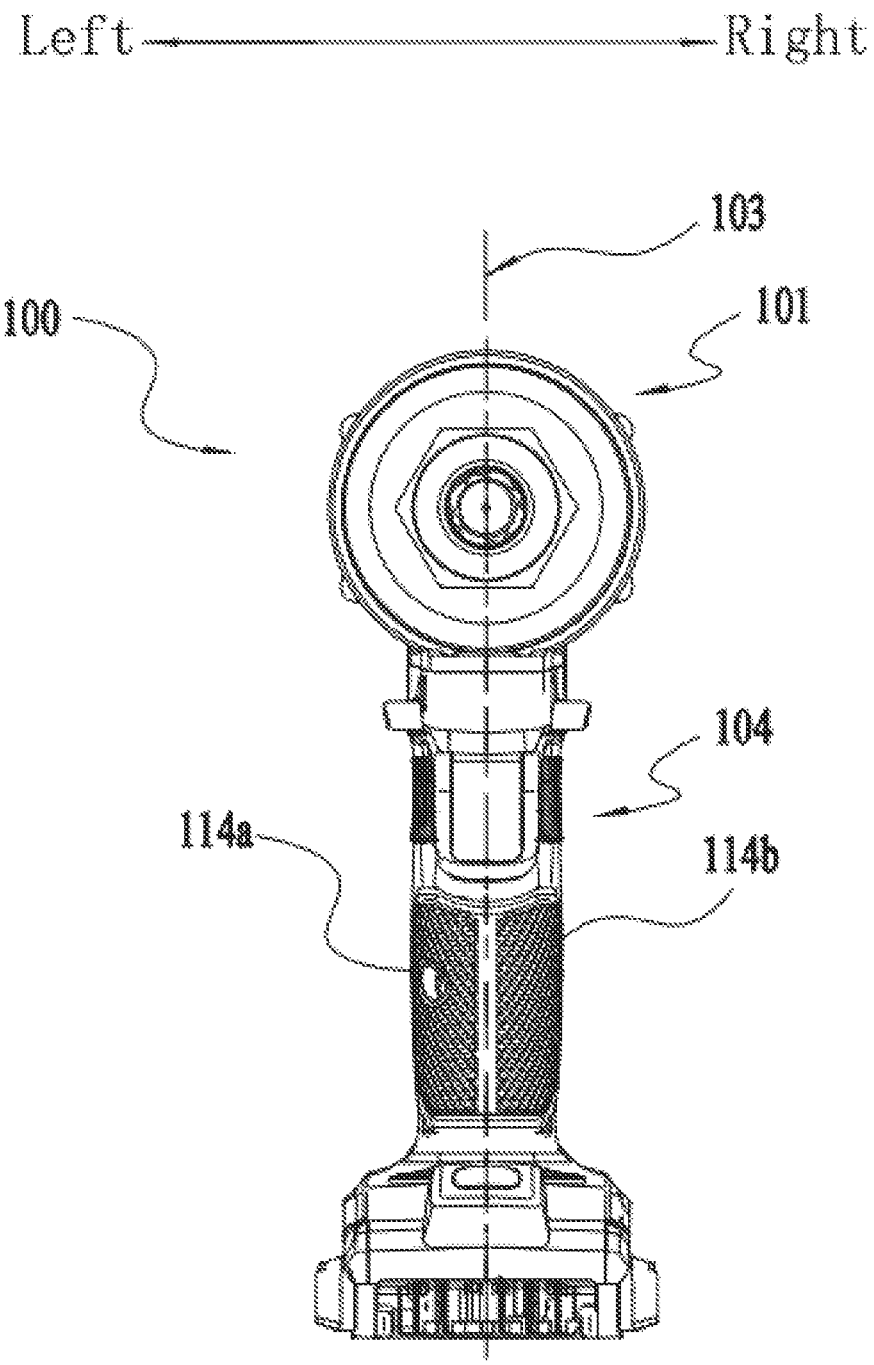
FIG. 2 is a front view of the handheld power tool shown in FIG. 1.

As shown in FIGS. 1 and 2, the handheld power tool 100 includes a tool head 101 and a grip 104. The tool head 101 is fixedly connected to the grip 104. A drive mechanism 200, a transmission mechanism 400, an output mechanism 300, and the like are provided in the tool head 101, where the drive mechanism 200 includes an electric motor and a drive shaft; the transmission mechanism 400 includes a gear assembly 410 and the like and connects the drive mechanism 200 to the output mechanism 300; and the output mechanism includes an output shaft 332 and a working accessory connected to the output shaft 332. The drive mechanism 200, the transmission mechanism 400, and the output mechanism 300 are drivingly connected in sequence in the tool head 101 along an extension direction of a straight line 102 (where the extension direction of the straight line 102 is defined as an axial direction). The grip 104 is disposed below the tool head 101 (where an up and down direction of the handheld power tool 100 is consistent with a direction in which the handheld power tool 100 is placed upright) and may be held by a hand of a user. The grip 104 includes a trigger 105, where the user presses the trigger 105 to start the handheld power tool 100. A control mechanism (not shown) is provided in the grip 104, and a control module undertakes the electronic control of the handheld power tool 100 and is not described in detail here. The specific position of the control module is not limited in the present application. A power supply device is connected below the grip 104, where the power supply device is used for supplying power to the power tool 100. The power supply device in this example is a battery pack. The battery pack is electrically connected to the control mechanism and the drive mechanism 200, and the battery pack supplies power to the drive mechanism 200. The power tool may be an alternating current tool, and the power supply device includes a plug and a wire connected to mains electricity.

For ease of description, a front and rear direction and a left and right direction are shown and defined in FIGS. 1 and 2, respectively. As shown in FIGS. 1 and 2, most of a body of the handheld power tool 100 is enclosed in a housing 110, and the housing 110 in this example includes a barrel 111, a head housing 112, and a rear housing 113 of the tool head 101 and a handle housing 114 of the grip 104. The handle housing 114 is substantially symmetrical about a straight line 103. In an example, the handle housing 114 is composed of a left handle housing 114a and a right handle housing 114b. The left handle housing 114a and the right handle housing 114b may be plastic. A surface of the left handle housing 114a and a surface of the right handle housing 114b are at least partially covered with a non-slip material such as rubber and silica gel, so as to obtain a better hand feel. In fact, the barrel 111 and the head housing 112 are also substantially symmetrical about the straight line 103. Unlike the handle housing 114, the barrel 111 is an integral part and the head housing 112 is also an integral part. Optionally, the barrel 111 is a metal part and the head housing 112 is also a metal part.

Figure 3:
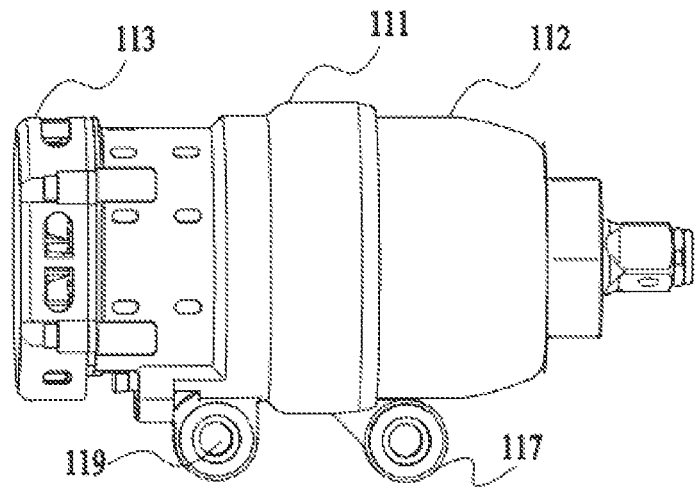
FIG. 3 is a side view of a tool head of the handheld power tool shown in FIG. 1.
Figure 4:
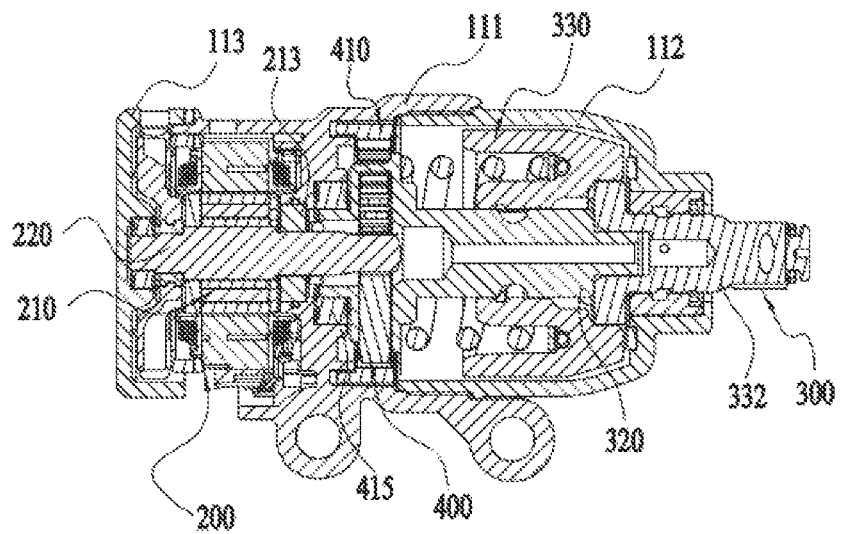
FIG. 4 is a sectional view of a tool head of the handheld power tool shown in FIG. 1.

Referring to FIGS. 3 to 5, the head housing 112 is disposed at a front end of the whole tool head 101, and a rear end portion of the head housing 112 extends into a front end portion of the barrel 111. The barrel 111 is disposed behind the head housing 112. In an example, the barrel 111 and the head housing 112 are in a threaded connection. That is to say, the portion of the head housing 112 extending into the barrel 111 is formed with an external thread 135, and the portion of the barrel 111 in contact with the head housing 112 is formed with an internal thread 136. When the head housing 112 is screwed into the barrel 111, the external thread 135 of the head housing 112 mates with the internal thread 136 of the barrel to form the threaded connection. Conventional screw connections require an additional space to be reserved for screw posts and screw holes, increasing a radial dimension of the tool head 101. Compared with the screw connections, the threaded connection does not need to occupy an additional radial space and reduces the radial dimension of the tool head 101 so that the handheld power tool 100 can be applied to a narrower space, improving user experience.

Figure 5A:
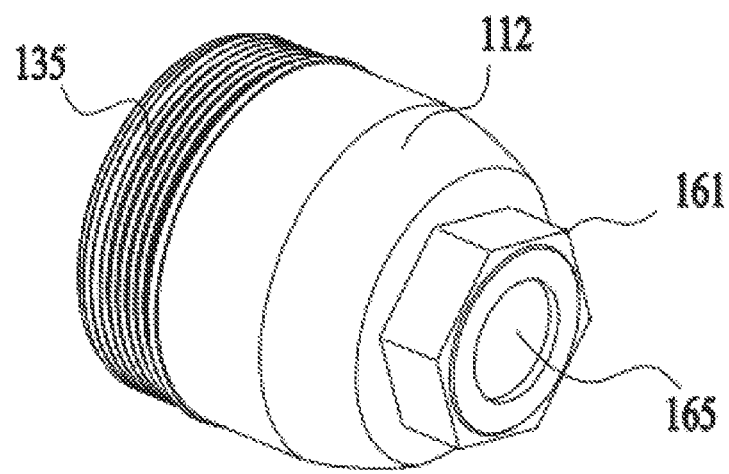
FIG. 5A is a perspective view of a head housing according to an example.
Figure 5B:
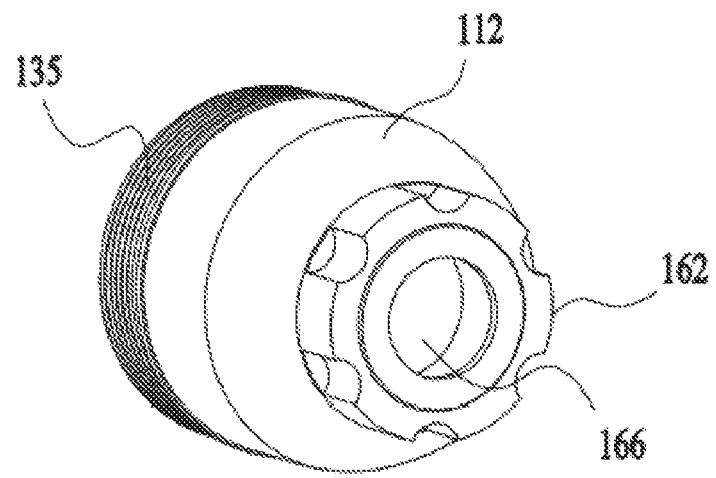
FIG. 5B is a perspective view of a head housing according to another example.
Figure 5C:
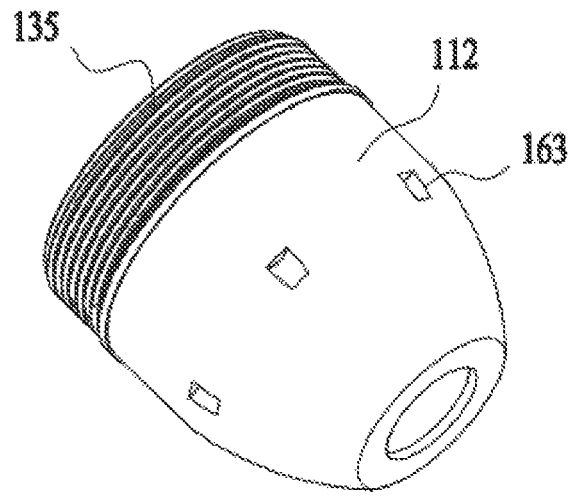
FIG. 5C is a perspective view of a head housing according to another example.
Figure 5D:
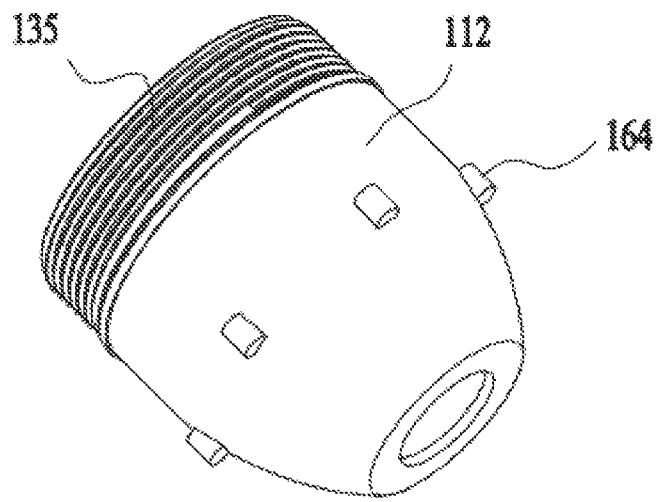
FIG. 5D is a perspective view of a head housing according to another example.

To facilitate the application of a force to screw the barrel 111 and the head housing 112 and implement an easier assembly process and a tighter connection between the barrel 111 and the head housing 112, a locking structure may be added on the head housing 112. Referring to FIG. 5A, a boss 161 is formed at a front end of the head housing 112. In an example, the boss is shaped like a hexagonal flange, a through hole 165 is formed at the center of the boss 161, the output shaft 332 is at least partially accommodated in the head housing 112, a front end of the output shaft 332 extends outward from the through hole 165 of the boss 161, and the output shaft 332 may be connected to the working accessory and output power to the outside. Optionally, the boss 161 and the head housing 112 are integrally formed. It is to be noted that the boss of the present application is not limited to a hexagonal boss or even a polygonal boss. Referring to FIG. 5B, a boss 162 is shaped like a gear, and when the head housing 112 is assembled, a force can be applied to recesses on a side surface of the boss 162. Similarly, a through hole 166 is formed at the center of the boss 162 so that the front end of the output shaft 332 extends outward from the through hole 166 of the boss 162. Optionally, the boss 162 and the head housing 112 are integrally formed. The locking structure is not limited to even the boss, and the locking structure is not necessarily disposed at the front end of the head housing. Referring to FIG. 5C, multiple recess portions 163 are circumferentially distributed on the periphery of the head housing 112. When the head housing 112 is assembled, a robotic claw may be used for gripping the multiple recess portions 163 at the same time to apply a force, or a corresponding tooling set may be used for applying a force to the multiple recess portions 163. Optionally, the multiple recess portions 163 and the head housing 112 are integrally formed. Similarly, referring to FIG. 5D, multiple protrusion portions 164 are circumferentially distributed on the periphery of the head housing 112. When the head housing 112 is assembled, a corresponding tooling set may be used for applying a force to the multiple protrusion portions 164. Optionally, the multiple protrusion portions 164 and the head housing 112 are integrally formed.

Additionally, to further prevent the threaded connection between the barrel 111 and the head housing 112 from being loosened during use of the handheld power tool 100, a threadlocker may be applied to the threads. The rear housing 113 is disposed at a rear end of the tool head 101 and fixed to the barrel 111 by screws from the rear end of the tool head 101. That is to say, in a front to rear direction, the head housing 112, the barrel 111, and the rear housing 113 are connected in sequence to constitute the tool head 101 of the handheld power tool 100, and the barrel 111 connects the head housing 112 to the rear housing 113 therebetween.

Figure 6:
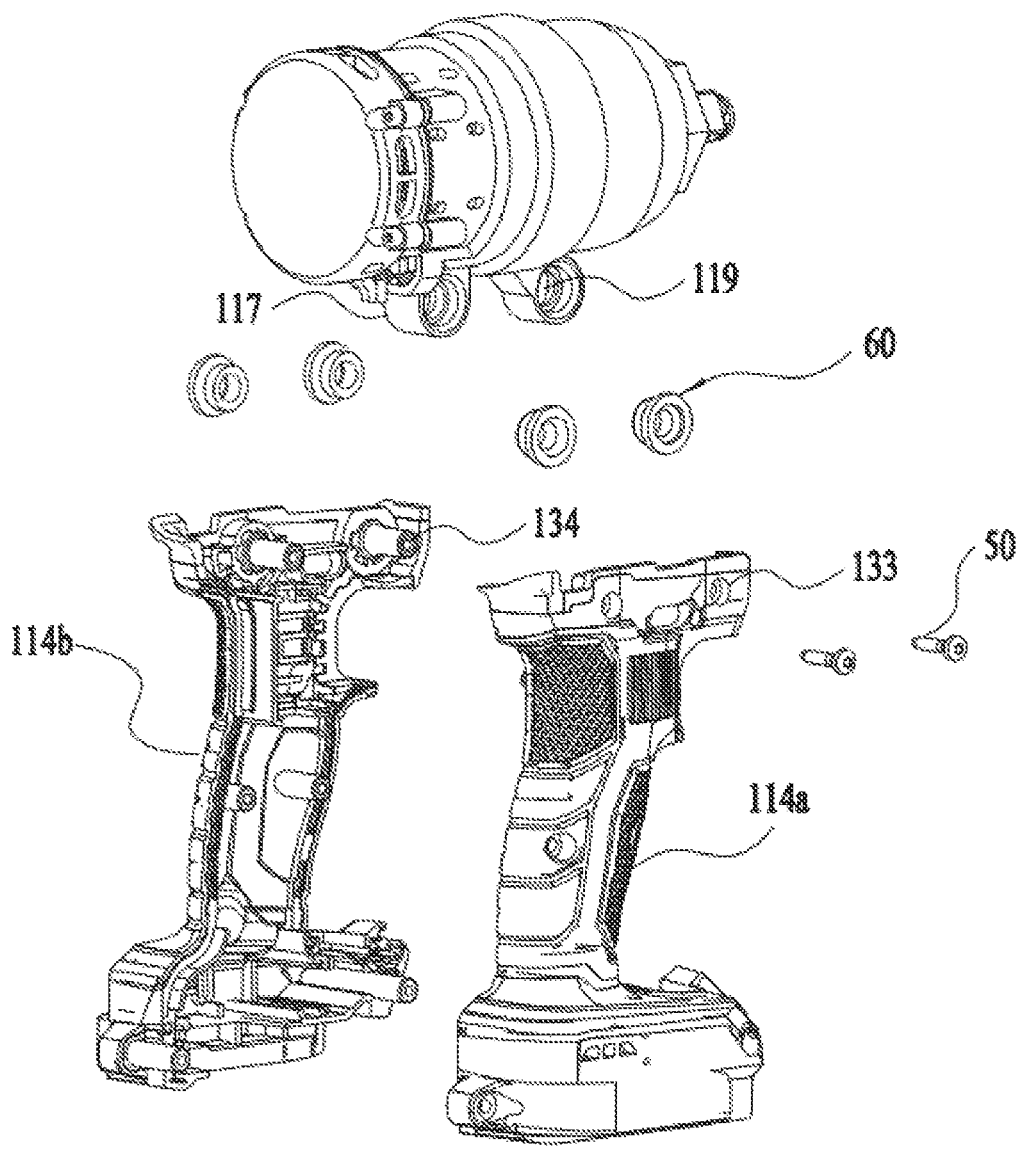
FIG. 6 is an exploded view of part of structures of a tool head and a grip of the handheld power tool shown in FIG. 1.

As shown in FIG. 6, an upper portion of the handle housing 114 is provided with first mounting holes, and protruding portions 117 on a lower portion of the barrel 111 are provided with second mounting holes 119 mating with the first mounting holes. Optionally, the lower portion of the barrel 111 is provided with two second mounting holes 119. The grip 104 and the tool head 101 are connected by first fasteners 50. Specifically, the handle housing 114 and the barrel 111 are connected by the first fasteners 50, and the first fasteners 50 penetrate through the first mounting holes and the second mounting holes 119 to connect the handle housing 114 and the barrel 111. Optionally, soft rubber sleeves 60 are provided between the first fasteners 50 and the second mounting holes 119, and two soft rubber sleeves 60 are symmetrically provided for each second mounting hole 119. When the handheld power tool 100 is working, the soft rubber sleeves 60 can attenuate the vibration of the barrel 111 and reduce an impact of the vibration, thereby achieving a damping effect. During installation, the two soft rubber sleeves 60 are inserted into the second mounting hole 119 from two ends of the second mounting hole 119.

Since the handle housing 114 includes the left handle housing 114a and the right handle housing 114b, the first mounting holes include through holes 133 on the left handle housing 114a and threaded holes 134 on the right handle housing 114b and corresponding to the through holes 133.

Optionally, the first fasteners 50 are screws, the soft rubber sleeves 60 are placed within the second mounting holes 119 and sleeved on screw posts of the screws, and the screws penetrate through the through holes 133 and are connected to the threaded holes 134. To facilitate the installation and detachment of the soft rubber sleeves 60, a limiting flange is provided at an end of the soft rubber sleeve 60. The soft rubber sleeves 60 are disposed on two sides of the second mounting hole 119 to ensure the damping effect. During installation, the soft rubber sleeves 60 are inserted into the second mounting holes 119, and the protruding portions 117 of the barrel 111 are sandwiched between the left handle housing 114*a* and the right handle housing 114*b* and then locked by the first fasteners 50.

Figure 7:
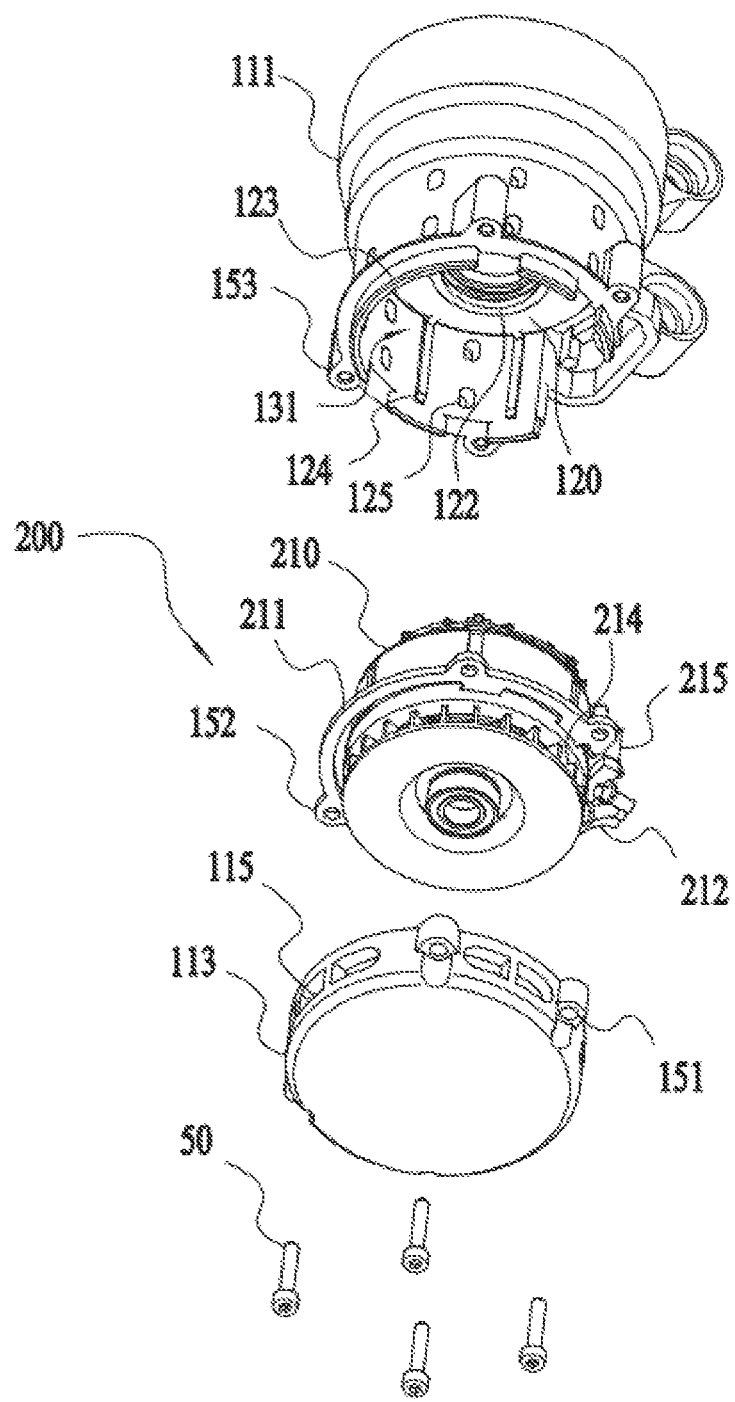
FIG. 7 is an exploded view of part of structures of the tool head shown in FIG. 3.
Figure 8:
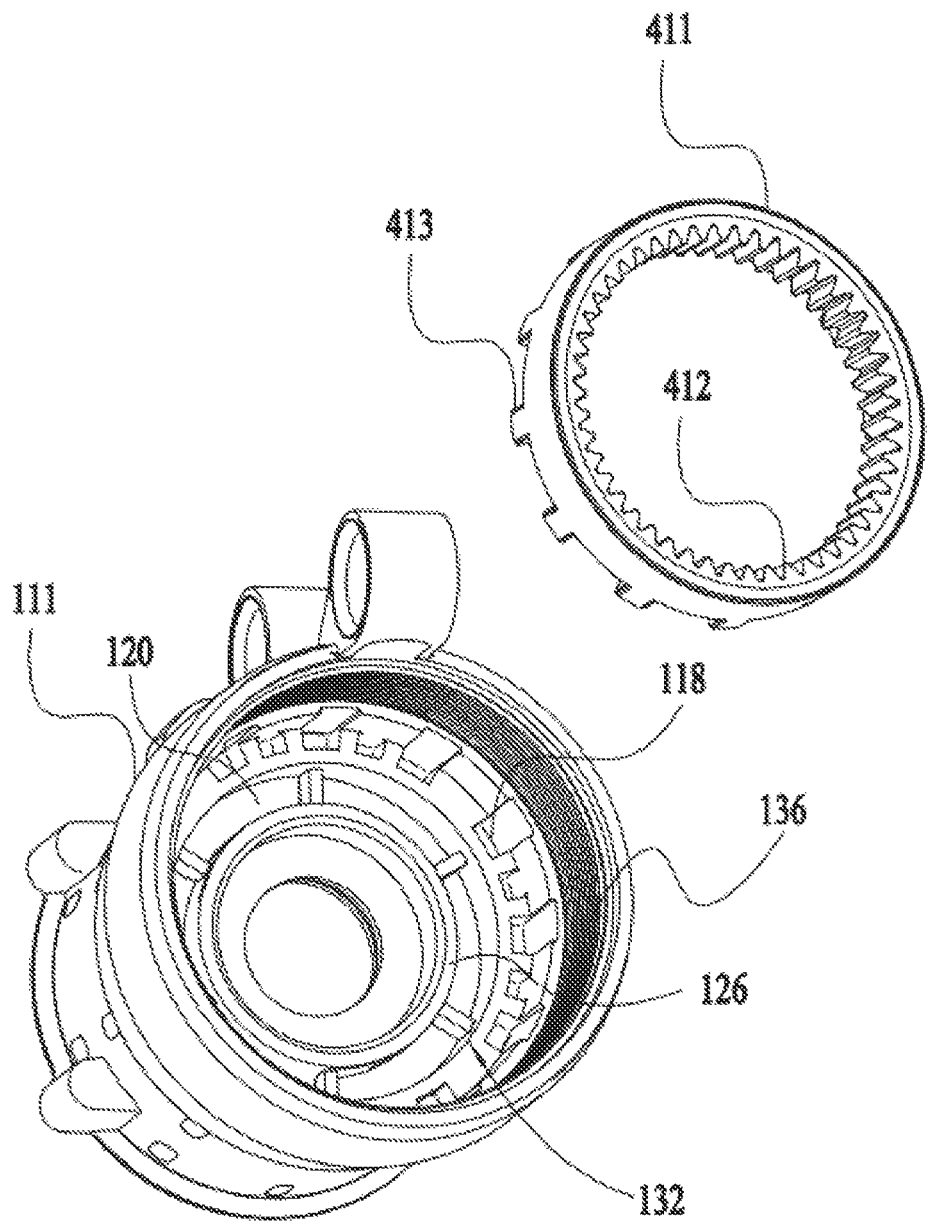
FIG. 8 is a structural view of a barrel and an inner ring gear of the tool head shown in FIG. 3.

In an example, the integral barrel 111 serves as both a housing of the electric motor 210 and a casing of the gear assembly 410. The drive mechanism 200 includes the electric motor 210 and the drive shaft 220. The electric motor 210 converts electrical energy provided by the battery pack into mechanical energy, the drive shaft 220 transmits a rotational motion outputted by the electric motor 210 to a main shaft 320, and finally the rotation of the main shaft 320 is converted into rotation pulses of a rotary impact assembly 330. Specifically, a driving gear (not shown) is provided at a front end of the drive shaft 220 and drivingly connected to other gears on a gear carrier 414, for example, planet gears 415, to transmit the rotation of the drive shaft 220 to the main shaft 320, thereby achieving power transmission. Referring to FIGS. 7 and 8, the drive mechanism 200 is at least partially accommodated in the barrel 111, an accommodation space inside the barrel 111 is approximately cylindrical, and a barrier 120 perpendicular to the drive shaft 220 is formed inside the barrel 111, where the barrier 120 divides a cylindrical accommodation cavity in the barrel 111 into two accommodation cavities at different positions in the axial direction (the front and rear direction), a first accommodation cavity 131 exists on one side of the barrier 120, and a second accommodation cavity 132 exists on the other side of the barrier 120. In the front and rear direction defined in FIG. 1, the electric motor 210 is mounted in the first accommodation cavity 131 on the rear side of the barrier 120, and the gear assembly 410 is mounted in the second accommodation cavity 132 on the front side of the barrier 120. A through hole 121 is provided at the center of the barrier 120 for the drive shaft 220 to penetrate through, an end of the drive shaft 220 is fixedly connected to the electric motor 210 in the first accommodation cavity 131, and the driving gear at the other end of the drive shaft 220 meshes with the gear assembly 410 in the second accommodation cavity 132. Optionally, the through hole 121 is circular, and since the accommodation cavity in the barrel is approximately cylindrical, the barrier 120 is substantially ring-shaped. The barrier may be provided in other shapes to implement a similar function. Optionally, the barrier 120 is also a metal part and integrally formed with the barrel 111. The rear housing 113 is disposed at a rear end of the barrel 111, and several first fasteners 50 penetrate through several mounting holes 151 of the rear housing 113 and several mounting holes 152 of a motor end plate 211 and are finally fixed into several mounting holes 153 of the barrel 111 from a rear end of the rear housing 113. Optionally, the first fasteners 50 are screws, and the mounting holes 151, the mounting holes 152, and the mounting holes 153 are screw holes. Through the first fasteners 50 and several mounting holes corresponding to the first fasteners 50, the electric motor 210 may be axially fixed in the enclosure of the rear housing 113 and the barrel 111, thereby avoiding the axial movement of the electric motor 210. A manner of fixing the electric motor 210 is not limited to the use of screws and mounting holes, and the electric motor 210 may be mounted to the barrel 111 in other manners.

Referring to FIG. 7, to better accommodate the electric motor 210, the barrel 111 also includes some other adapting structures designed to improve the performance of the handheld power tool 100 in various aspects. In an example, several axially extending positioning ribs 124 are circumferentially distributed on an inner wall of the barrel 111 behind the barrier 120. In one aspect, these positioning ribs 124 can enhance the strength of the barrel 111. In the other aspect, after the electric motor 210 is mounted to the barrel 111, the electric motor 210 is centrally positioned, thereby improving the installation accuracy of the electric motor 210, preventing the electric motor 210 from shaking in the barrel 111, and reducing the vibration of the electric motor 210 in a working process. In an example, a circle of several discontinuous flanges 123 is distributed on the edge of the rear end of the barrel 111, where the flanges 123 may have the same shape and length or have different shapes and lengths. When the electric motor 210 is mounted to the barrel 111, these discontinuous flanges 123 are inserted into gaps between the motor end plate 211 and a body of the electric motor 210 separately, thereby circumferentially limiting the electric motor 210, improving the installation accuracy of the electric motor 210, and preventing a rotation of the electric motor 210 relative to the barrel 111 in the working process.

Figure 11:
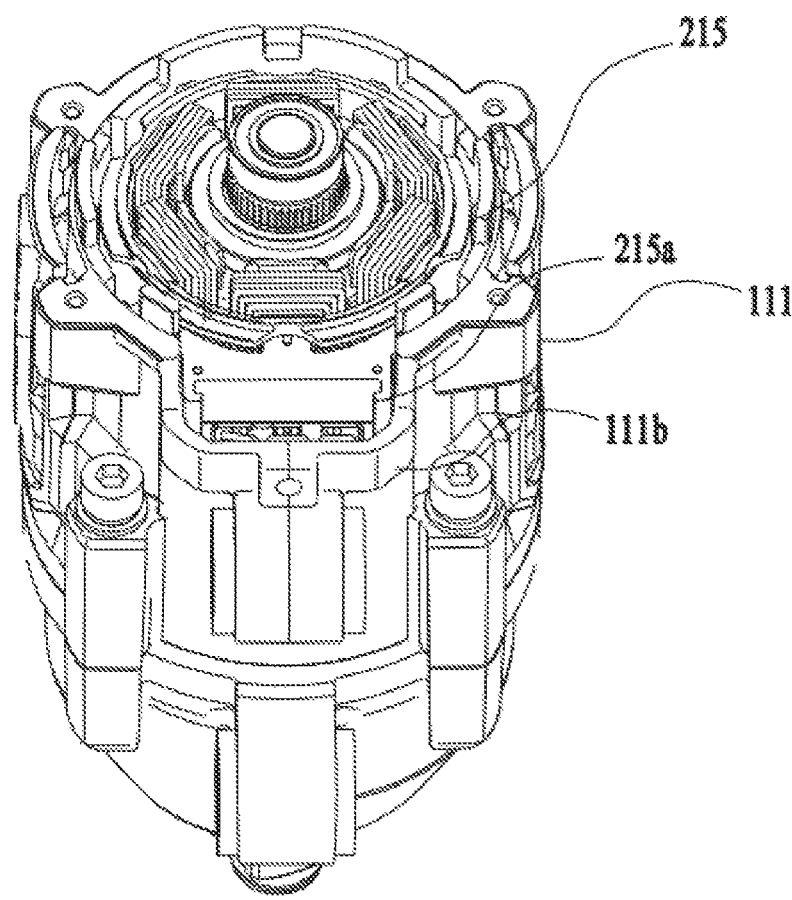
FIG. 11 is a structural view of an example in which a stator of an electric motor is prevented from rotating.

It is to be understood that the electric motor used in the power tool includes a rotor and a stator and may be divided into an inrunner and an outrunner according to a position of the rotor. In this example, the electric motor 210 is rotated by an inner rotor, which may be understood as that a core body at the center of the electric motor is a rotating body. When the electric motor 210 is rotated by the inner rotor, the rotation of the stator of the electric motor needs to be prevented in a manner. As shown in FIG. 11, a side surface of a stator 215 protrudes and extends to form a first end portion 215*a*, the barrel 111 is formed with a rotation stopper 111*b* opposite to the first end portion 215*a*, and the first end portion 215*a* is disposed in a space formed by the rotation stopper 111*b*. Specifically, the rotation stopper 111*b* is formed with a groove mating with the first end portion 215*a* to prevent the rotation of the stator 215 of the electric motor 210. It is to be understood that this example is merely an exemplary rotation stopping manner and is not intended to limit specific shapes and positions of the first end portion 215*a* and the rotation stopper 111*b*, which may be set by those skilled in the art according to actual situations.

Referring to FIG. 4, the electric motor 210 further includes a front bearing 213. Referring to FIG. 7, in an example, a first bearing mount 122 is formed on a side of the barrier 120. Specifically, the first bearing mount 122 is disposed in the first accommodation cavity 131, and the first bearing mount 122 protrudes from the barrier 120 towards the rear of the barrel 111. When the electric motor 210 is mounted to the barrel 111, the first bearing mount 122 accommodates the front bearing 213 of the electric motor 210 without occupying an axial space, thereby avoiding an increase of an axial dimension of the barrel 111. In an example, several air vents 125 are opened on at least part of a surface of the barrel 111, which are conducive to improving a heat dissipation effect of the electric motor 210. Optionally, multiple air vents 125 are circumferentially distributed on a side surface of the barrel 111. Further, the rear housing 113 is also provided with several air vents 115.

Optionally, the electric motor 210 employs an axial fan, and multiple air vents 115 are circumferentially distributed on a side surface of the rear housing 113. During use of the handheld power tool 100, since the air vents 115 face an air inlet of a fan 214 of the electric motor 210, an airflow is driven by the fan 214 of the electric motor 210 to enter from the air vents 115 of the rear housing 113 and be discharged from the air vents 125 of the barrel 111, thereby achieving a good heat dissipation effect.

Figure 12:
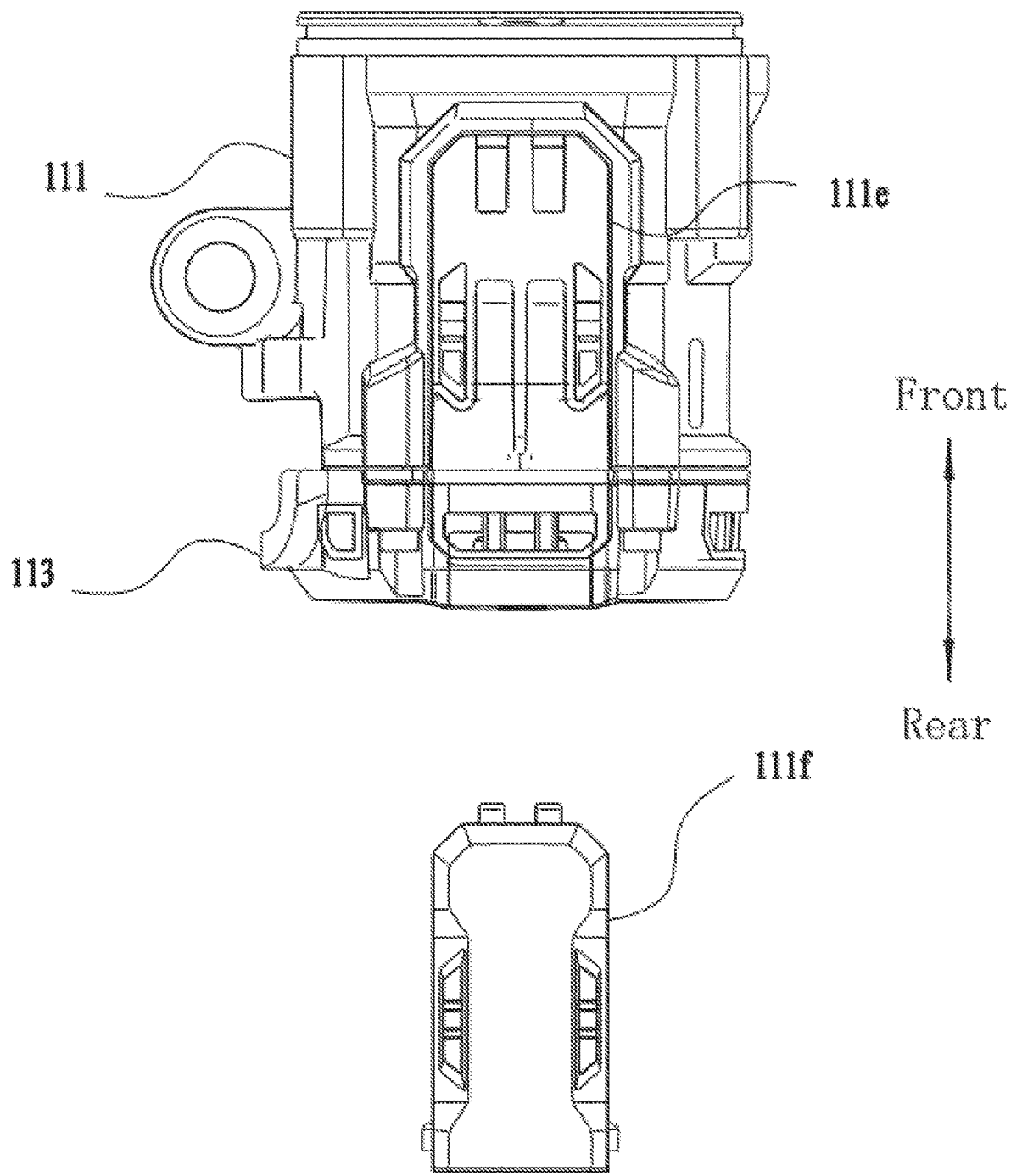
FIG. 12 is a structural view of an example in which a nameplate is mounted to a barrel.

As shown in FIG. 12, the handheld power tool 100 further includes a nameplate 111f for characterizing a brand of the power tool and corresponding parameter information. The barrel 111 is formed with an insertion slot 111e for mounting the nameplate 111f. During assembly, the nameplate 111f is mounted forward to the barrel 111 along the insertion slot 111e, and the rear housing 113 is mounted to the barrel 111 to fix the nameplate 111f to the barrel 111. With such arrangement, when the handheld power tool 100 is subjected to after-sales maintenance, the nameplate 111f does not need to be replaced, thereby saving costs.

Figure 9:
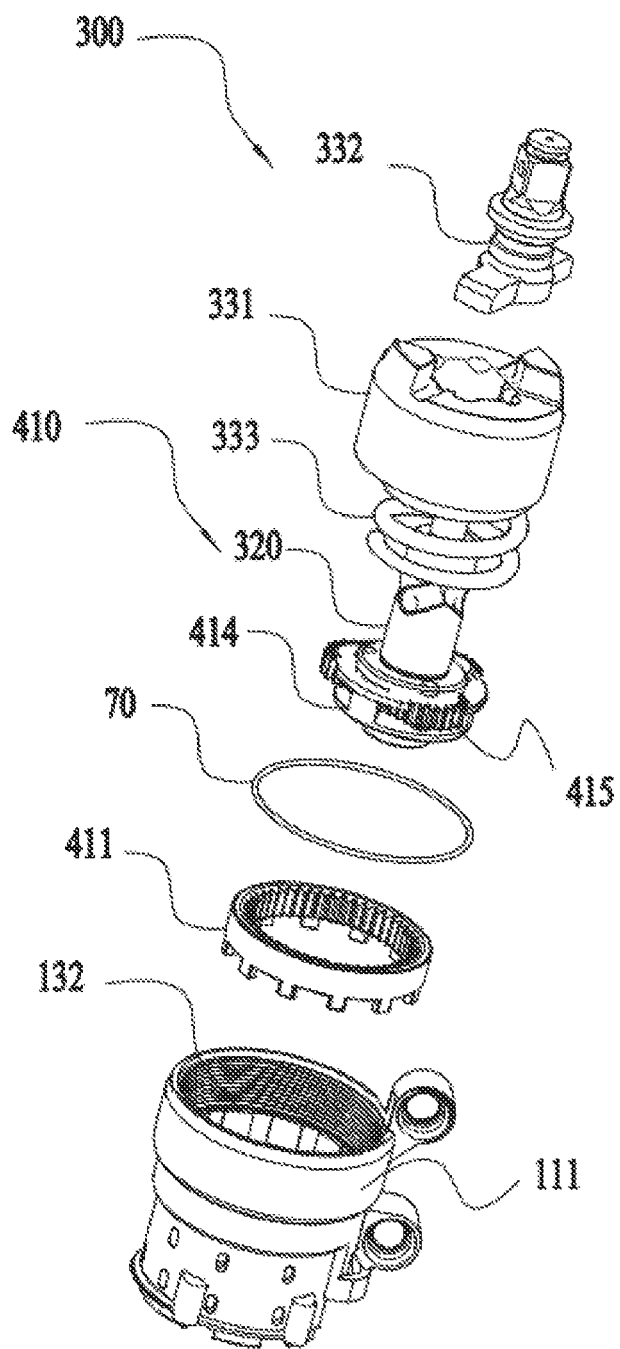
FIG. 9 is an exploded view of part of structures of the tool head shown in FIG. 3.
Figure 10A:
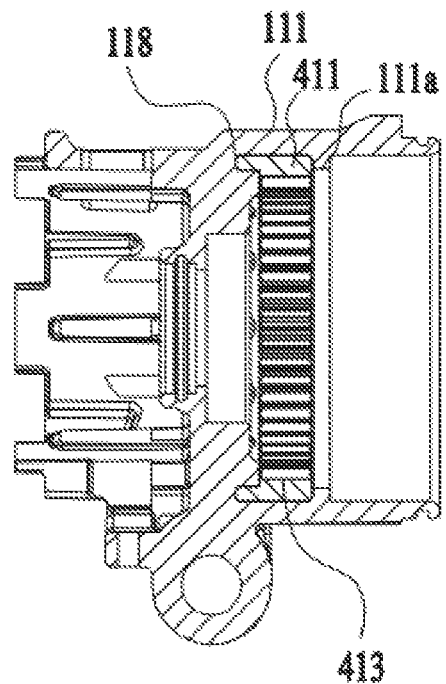
FIG. 10A is a structural view of another example in which an inner ring gear is fixed to a barrel.
Figure 10B:
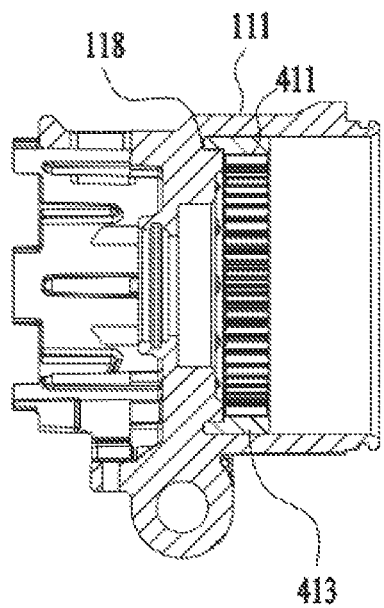
FIG. 10B is a structural view of another example in which an inner ring gear is fixed to a barrel.

Referring to FIGS. 8 and 9, the gear assembly 410 is mounted in the second accommodation cavity 132 at a front end of the barrel 111. In an example, the gear assembly 410 includes an inner ring gear 411 that does not rotate. As shown in FIG. 8, the inner ring gear 411 is formed with a circle of teeth 412 protruding inward and used for meshing with gears, for example, the planet gears 415 on the gear carrier 414, so that the planet gears 415 rotate in the inner ring gear 411 to drive the gear carrier 414 and the main shaft 320 to rotate. In an example, the inner ring gear 411 is formed with a first meshing portion, the inner wall of the barrel 111 is formed with a second meshing portion, and the first meshing portion of the inner ring gear 411 meshes with the second meshing portion of the barrel 111 to fix the inner ring gear 411 to the barrel 111. Specifically, the inner ring gear 411 may be formed with multiple axially protruding mounting feet 413 circumferentially distributed around the inner ring gear 411, and the inner wall of the barrel 111 is formed with multiple mounting grooves 118 mating with the mounting feet 413, where the multiple mounting grooves 118 are disposed in front of the barrier 120. The mounting feet 413 mate with the mounting grooves 118 to fix the inner ring gear 411 in the barrel 111. A manner of mounting the inner ring gear 411 to the barrel 111 is not limited to the mounting feet and the mounting grooves. In an example, an outer side of the inner ring gear 411 is formed with a circle of external teeth, the inner wall of the barrel 111 is formed with a circle of internal teeth, and the external teeth of the inner ring gear 411 mesh with the internal teeth of the barrel 111 to prevent the inner ring gear 411 from circumferentially rotating relative to the barrel 111. As another possible example, referring to FIG. 10A, the mounting feet 413 of the inner ring gear 411 mesh with the mounting grooves 118 of the barrel 111 to limit the inner ring gear 411, and meanwhile an inner ring gear limiting portion 111a on the barrel 111 further limits the inner ring gear 411. During production and assembly, as an insert of the barrel 111, the inner ring gear 411 is integrally formed with the barrel 111. As yet another possible example, referring to FIG. 10B, the mounting feet 413 of the inner ring gear 411 mesh with the mounting grooves 118 of the barrel 111 to limit the inner ring gear 411. A difference from the above example lies in that the mounting feet 413 of the inner ring gear 411 and the mounting grooves 118 of the barrel 111 are mounted in an interference press-fit manner, and the inner ring gear 411 needs to be fixed inside the barrel 111 via a tool during assembly. Additionally, the inner ring gear 411 may be indirectly mounted to the barrel 111 via another auxiliary connector including, but not limited to, a gasket or the like. That is to say, the specific structure of the inner ring gear 411 is not limited in the present application as long as the inner ring gear 411 can be mounted to the inside of the barrel 111.

Referring to FIG. 4, the gear assembly 410 further includes a bearing 415. Referring to FIG. 8, in an example, a second bearing mount 126 is formed on the other side of the barrier 120. Specifically, the second bearing mount 126 is disposed in the second accommodation cavity 132, and the second bearing mount 122 protrudes from the barrier 120 towards the front of the barrel 111. When the gear assembly 410 is mounted to the barrel 111, the second bearing mount 126 accommodates the bearing 415 of the gear assembly 410 without occupying an axial space, thereby avoiding an increase of the axial dimension of the barrel 111. Further, the head housing 112 axially fixes the gear assembly 410. Specifically, as shown in FIG. 9, after the head housing 112 is screwed into the barrel 111, the head housing 112 further presses the inner ring gear 411 and the gear carrier 414 of the gear assembly 410 tight through a gasket 70. In this manner, the barrel 111 functions as a gearbox while serving as part of the housing and a motor housing, reducing the number of parts, assembly complexity, and production costs. Moreover, with a conventional gearbox removed, the whole tool head is more compact in structure and has a smaller radial dimension to be convenient to apply to a narrower space.

Referring to FIG. 9, the output mechanism 300 of the present application includes the main shaft 320 and the rotary impact assembly 330, where the rotary impact assembly includes an impact block 331 and the output shaft 332. The main shaft 320 is fixedly connected to or integrally formed with the gear carrier 414. The main shaft 320 is drivingly connected to the output shaft 332 and the drive shaft 220. The main shaft 320 is provided with a V-shaped groove for forming a rotational impact so that the continuous rotational output of the electric motor 210 is converted into an impact rotation pulse. Specifically, the V-shaped groove on the main shaft 320 is connected to the impact block 331 through a steel ball and used for driving the impact block 331 to axially impact, thereby achieving an axial motion and a rotational motion of the main shaft 320. Meanwhile, the rotary impact assembly 330 further includes a spring 333 for resetting the impact block 331. The output shaft 332 is disposed at a front end of the tool head 101 and used for outputting power to the outside. Specifically, the output shaft 332 may be connected to the working accessory and output power to the outside. For the impact wrench, the working accessory is a sleeve. For the impact screwdriver, the working accessory is a screwdriver bit.

Figure 13:
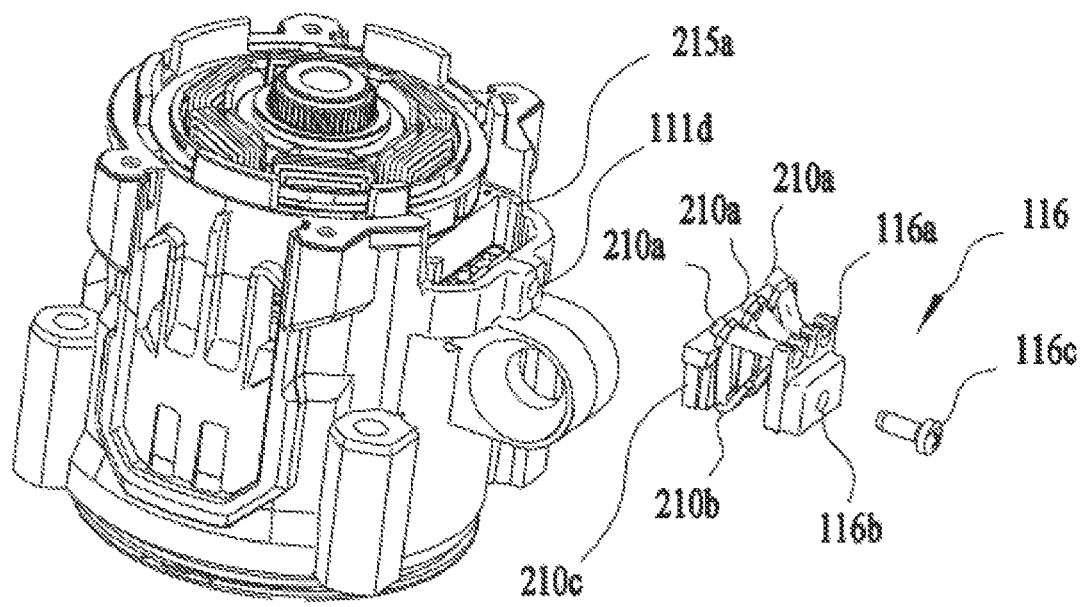
FIG. 13 is a structural view of a wire clamping component as an example.
Figure 14:
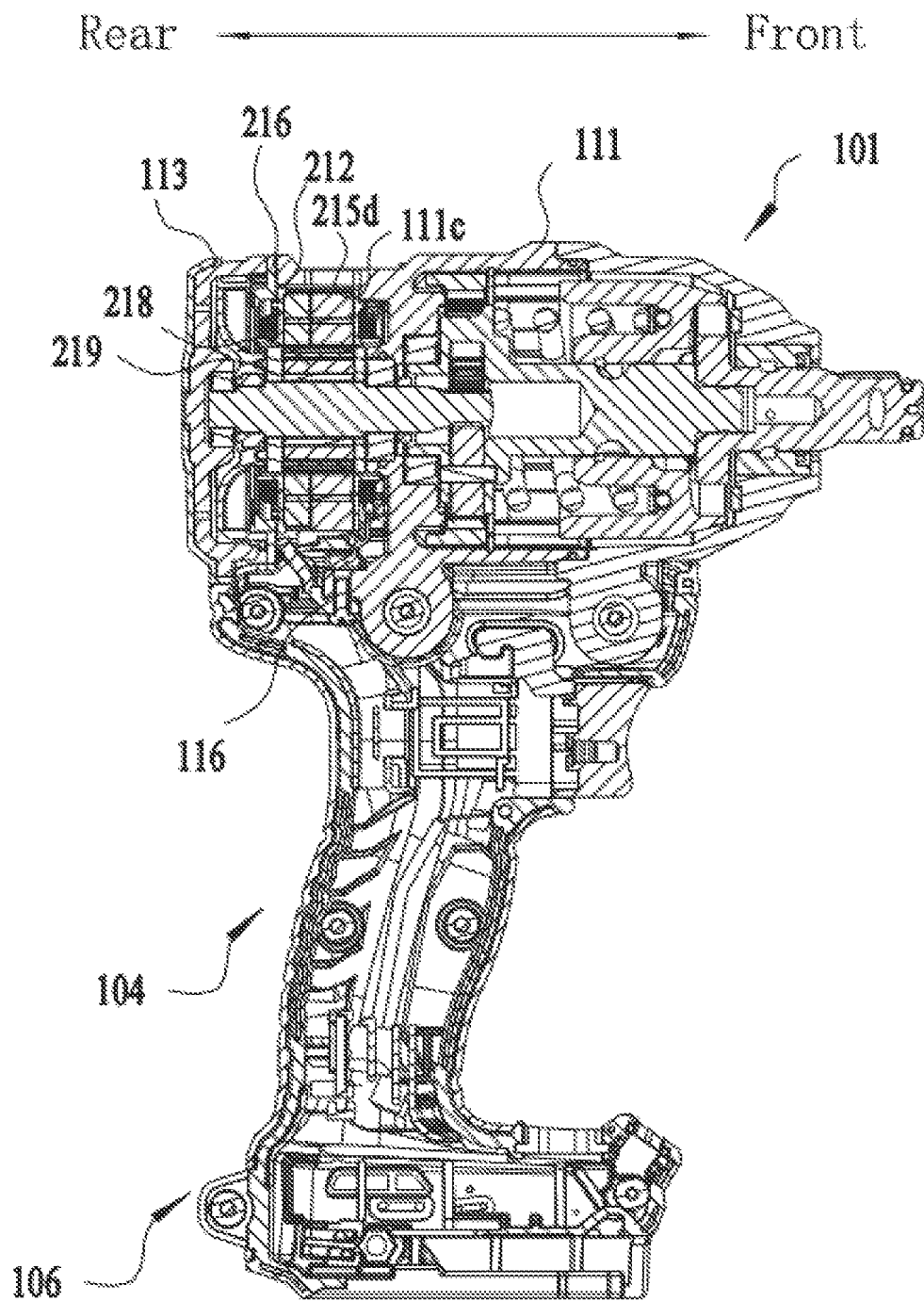
FIG. 14 is a sectional view of a handheld power tool as an example.

In some examples, the electric motor 210 uses a three-phase brushless motor including a rotor with a permanent magnet and three-phase stator windings U, V, and W electronically commutated. The three-phase stator windings U, V, and W adopt a star connection. The three-phase stator windings U, V, and W may also adopt a delta connection. However, it must be understood that other types of brushless motors are also within the scope of the present disclosure. The brushless motor may include less or more than three phases. As shown in FIGS. 13 and 14, the handheld power tool 100 further includes a wire clamping device 116. Specifically, the wire clamping device 116 is disposed between the tool head 101 and the grip 104 in the up and down direction. The tool head 101 is formed with or fixedly connected to the wire clamping device 116 disposed between the tool head 101 and the grip 104 to fix wires 210a. The grip 104 protrudes from the lower side of the tool head 101 and extends to be connected to the power supply device 106. Specifically, the wire clamping device 116 is provided with clamping slots 116a for fixing the wires 210a. The wire clamping device 116 is fixedly connected to the rotation stopper 111b of the barrel 111 by a screw 116c. During assembly, the wire clamping device 116 is fixedly connected to the rotation stopper 111b of the barrel 111 by the screw 116c penetrating through a screw hole 116b on the wire clamping device 116 and a screw hole 111d on the rotation stopper 111b. The wires 210a are connected to the three-phase stator windings U, V, and W separately through corresponding connecting sheets 210b. It is to be understood that in this example, the three-phase brushless motor is used. Therefore, the three-phase stator windings U, V, and W need to be connected to independent wires 210a, separately. As shown in FIG. 13, three wires 210a and three connecting sheets 210b are provided, and the wires 210a and the connecting sheets 210b are electrically connected through solder. Further, to ensure the insulation between the three wires 210a, the three connecting sheets 210b are fixedly connected to an insulating sheet 210c. Specifically, the connecting sheets 210b and the insulating sheet 210c are integrally formed. The connecting sheets 210b may be mounted to the insulating sheet 210c in a tight-fit manner or they may be fixed in another manner as long as it is ensured that the connecting sheets 210b can be fixedly mounted to the insulating sheet 210c and the connecting sheets 210b are insulated between each other. The connecting sheets 210b may be made of a metal material that can conduct electricity. It is to be understood that the windings of three phases U, V, and W of the electric motor 210 are connected to the connecting sheets 210b and then connected to the wires 210a through the connecting sheets 210b. The wire clamping device 116 may be made of an elastic and insulating material. During operation of the handheld power tool 100, a power head vibrates greatly and the wires 210a are bent. The wire clamping device 116 is mounted on the barrel 111 so that welding positions and solder wicking positions between the wires 210a and the connecting sheets 210b move synchronously with the barrel 111, and bending positions are transferred to a distal end, thereby improving the service life of the wires. As shown in FIG. 13, the insulating sheet 210c is fixedly connected to the first end portion 215a of the stator 215. Specifically, the first end portion 215a of the stator 215 is formed with an insertion slot (not shown), and the insulating sheet 210c is disposed in the insertion slot to be fixed to the stator 215.

Figure 15:
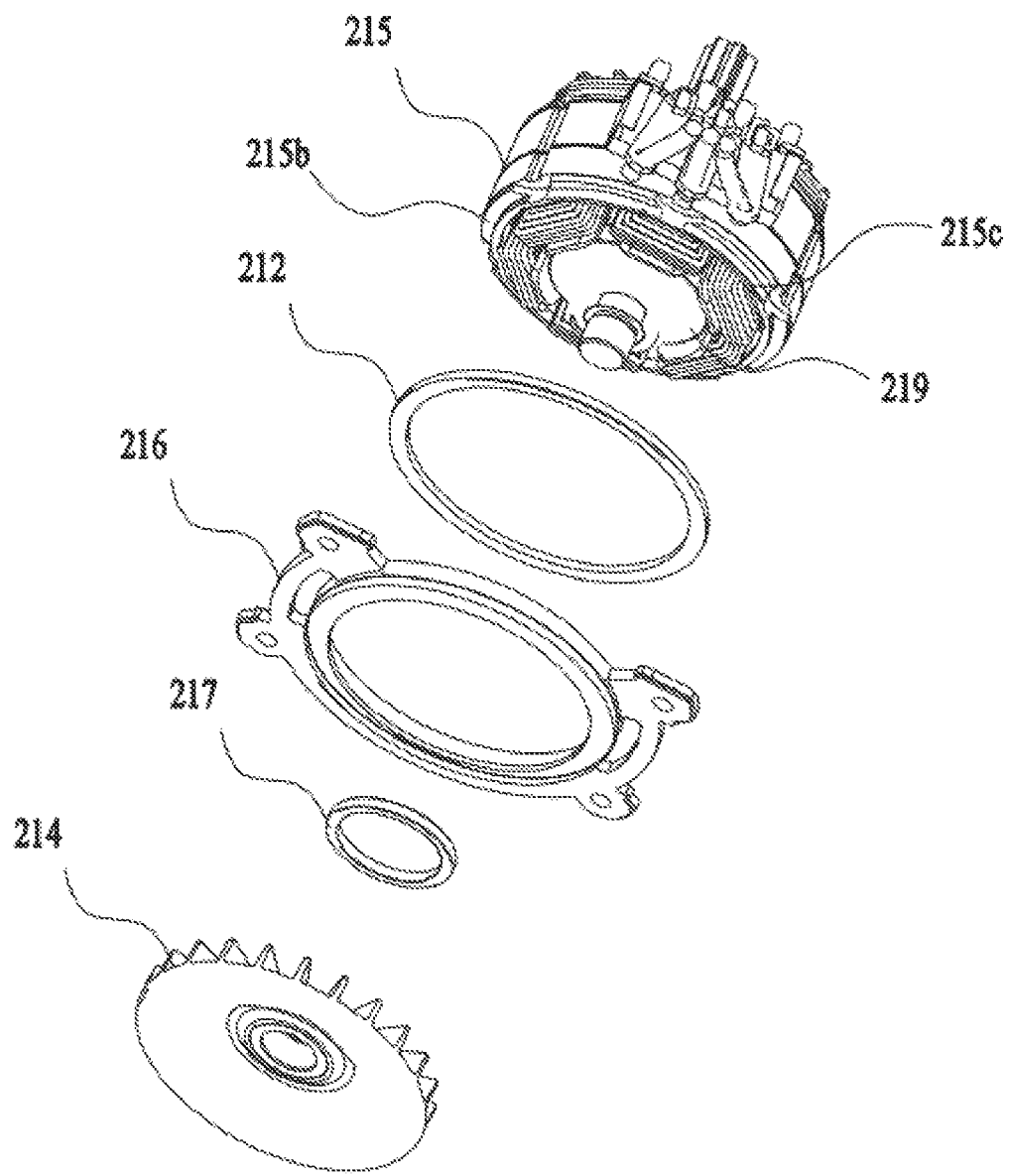
FIG. 15 is an exploded view of part of components in FIG. 14.
Figure 16:
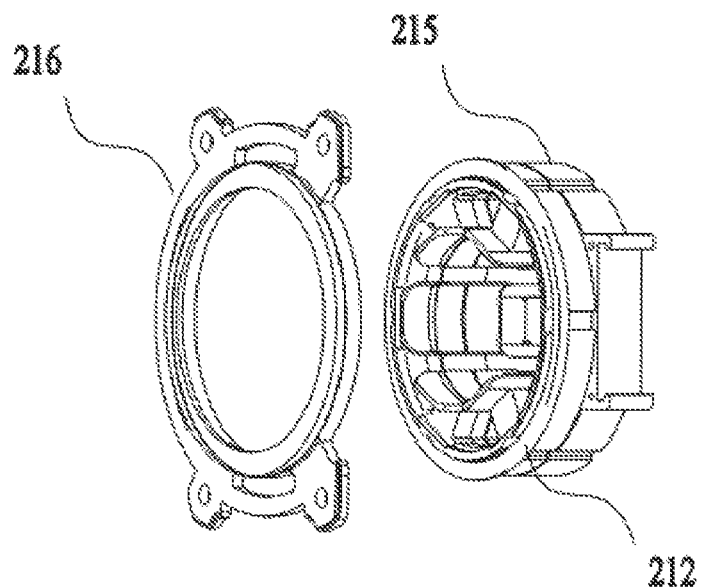
FIG. 16 is a structural view of a stator and a stator platen in FIG. 15.

In some examples, as shown in FIGS. 14 to 16, a stator platen 216 is further disposed between the barrel 111 and the rear housing 113 to limit the stator 215 in the front and rear direction. The stator platen 216 is provided with screw holes. During assembly, the rear housing 113 together with the stator platen 216 are fixedly mounted to the barrel 111 in a screw fastening manner. In this case, the rear housing 113 applies a forward thrust to the stator platen 216. Further, the stator platen 216 applies a forward thrust to the stator 215. It is to be understood that due to an accumulative error and a machining tolerance of the preceding components during machining, a certain gap exists between the stator platen 216 and the stator 215 in the front and rear direction, and thus the thrust applied by the rear housing 113 to the stator platen 216 cannot be well transmitted to the stator 215 to limit the stator 215. To solve the above problem, in this example, a first elastic member 212 is disposed between the stator platen 216 and the stator 215. Specifically, the electric motor 210 further includes a stator rear end cover 215c at a rear end of the stator 215, an annular boss 215b is formed on the stator rear end cover 215c, and the first elastic member 212 is sleeved on the annular boss 215b. Further, the stator rear end cover 215c is provided with multiple notches (not shown) in a circumferential direction, and a projection of the multiple notches on a plane perpendicular to the output shaft overlaps a projection of the first elastic member 212 on the plane perpendicular to the output shaft. The first elastic member 212 is deformable into the notches when undergoing elastic deformation.

It is to be understood that the first elastic member 212 can produce certain deformation under the action of a force. After the rear housing 113 applies the forward thrust to the stator platen 216, the stator platen 216 applies a thrust to the stator rear end cover 215c through the first elastic member 212 and further applies the forward thrust to the stator 215, and the first elastic member 212 deforms. An amount of deformation of the first elastic member 212 depends substantially on a magnitude of the thrust and the gap between the stator platen 216 and the stator rear end cover 215c. Specifically, the first elastic member 212 in this example is an O-shaped ring made of rubber. The elastic member 212 may be disposed on the stator platen 216 or the stator rear end cover 215c or may be integrally formed with the stator platen 216 or the stator rear end cover 215c, which is not limited here.

To further limit the stator 215 in the front and rear direction, a barrel boss 11c is further disposed at the front end of the barrel 111. Specifically, the barrel boss 111c is disposed on the inner wall of the barrel 111 and integrally formed with the barrel 111. Specifically, the electric motor 210 further includes a stator front end cover 215d at a front end of the stator 215, the barrel boss is formed inside the barrel, and the stator front end cover is partially disposed between the stator and the barrel boss in the front and rear direction. The barrel boss 111c abuts against the stator front end cover 215d in the front and rear direction to limit the stator. The barrel boss 111c and the barrel 111 are integrally formed. During assembly, the electric motor 210 is placed into the barrel 111 along the front and rear direction, and the electric motor 210 is limited at a first step in the front and rear direction after the stator front end cover 215d is in contact with the barrel boss 111c. After the first elastic member 212 is sleeved on the annular boss 215b on the stator rear end cover 215c, the stator platen 216 is placed, and finally the rear housing 113 and the stator platen 216 are fixedly mounted to the barrel 111 by the screws, thereby completing a second step of limiting. It is to be understood that after assembly, the stator 215 is limited by the barrel boss 111c in a forward direction, and the stator 215 is limited by the first elastic member 212 in a rearward direction. With the preceding technical solutions, when the user uses the handheld power tool 100, the stator 215 of the electric motor 210 is not displaced in the front and rear direction due to vibration even under a relatively severe working condition.

In some examples, as shown in FIGS. 14 to 17, the electric motor 210 further includes a rotor 218 and a rotor rear balance ring 219 behind the rotor 218. Generally, due to a balance requirement of the rotor of the electric motor, a balance ring is mounted on a shaft. In the related art, for most electric motors, a rotor balance ring is mounted on an outer side of a rotor end ring to protect the rotor end ring. When the electric motor is running, the rotor end ring is protected from destructive deformation due to temperature and a centrifugal force.

Figure 17:
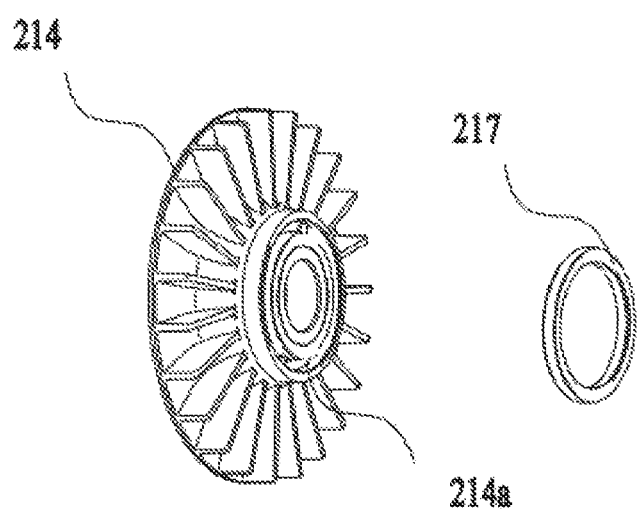
FIG. 17 is a structural view of a fan and a second elastic member in FIG. 15.

As shown in FIG. 14, the fan 214 and the electric motor 210 are arranged in sequence in the barrel 111. When the electric motor 210 is working, the fan 214 rotates to generate the circulation of an airflow, thereby carrying away heat generated on the electric motor 210. However, due to machining errors of the electric motor 210, the fan 214, and the barrel 111 or other parts during production and machining or due to an accumulative error of a design, a certain gap exists between the electric motor 210 and the fan 214 in the front and rear direction after the electric motor 210 and the fan 214 are placed in the barrel 111. Due to the above gap, the rotor rear balance ring 219 is easily loosened when the electric motor 210 is working and thus cannot well protect the rotor 218. To eliminate the above gap, as shown in FIG. 17, a second elastic member 217 is further disposed between the fan 214 and the rotor rear balance ring 219. Specifically, the fan 214 includes a first end portion (not shown) facing the rotor rear balance ring 219, and a front side surface of the first end portion is formed with or connected to a mounting portion 214a for placing the elastic member. The mounting portion 214a is provided in the shape of an annular groove. The second elastic member 217 is mounted within the annular groove. Specifically, the second elastic member 217 and the annular groove may be mounted in a tight-fit manner, may be integrally formed, or may be otherwise assembled, which is not limited here. In the preceding solution, mainly considering a dimension of the electric motor 210 in the front and rear direction, the simplicity of a design, and other aspects, the side surface of the first end portion of the fan 214 facing the electric motor 210 is provided with the mounting portion 214a for placing the second elastic member 217. If these factors do not need to be considered in the design, the rotor rear balance ring 219 may be provided with a groove for placing the elastic member. A position for placing the second elastic member 217 is not limited in the present application.

As shown in FIGS. 14 to 17, after the second elastic member 217 is placed in the annular groove 214a on the fan 214, the length of the second elastic member 217 in the front and rear direction is greater than the depth of the annular groove 214a. After the rear housing 113 is fastened to the barrel 111 by the screws, an interference amount of the second elastic member 217 can eliminate the preceding gap so that the rotor rear balance ring 219 is pressed tight in the front and rear direction. In this manner, the rotor rear balance ring 219 can press the rotor 218 tight even when the electric motor 210 rotates at a high speed or the power tool is working under various working conditions, thereby increasing the service life of the electric motor 210.

Figure 18:
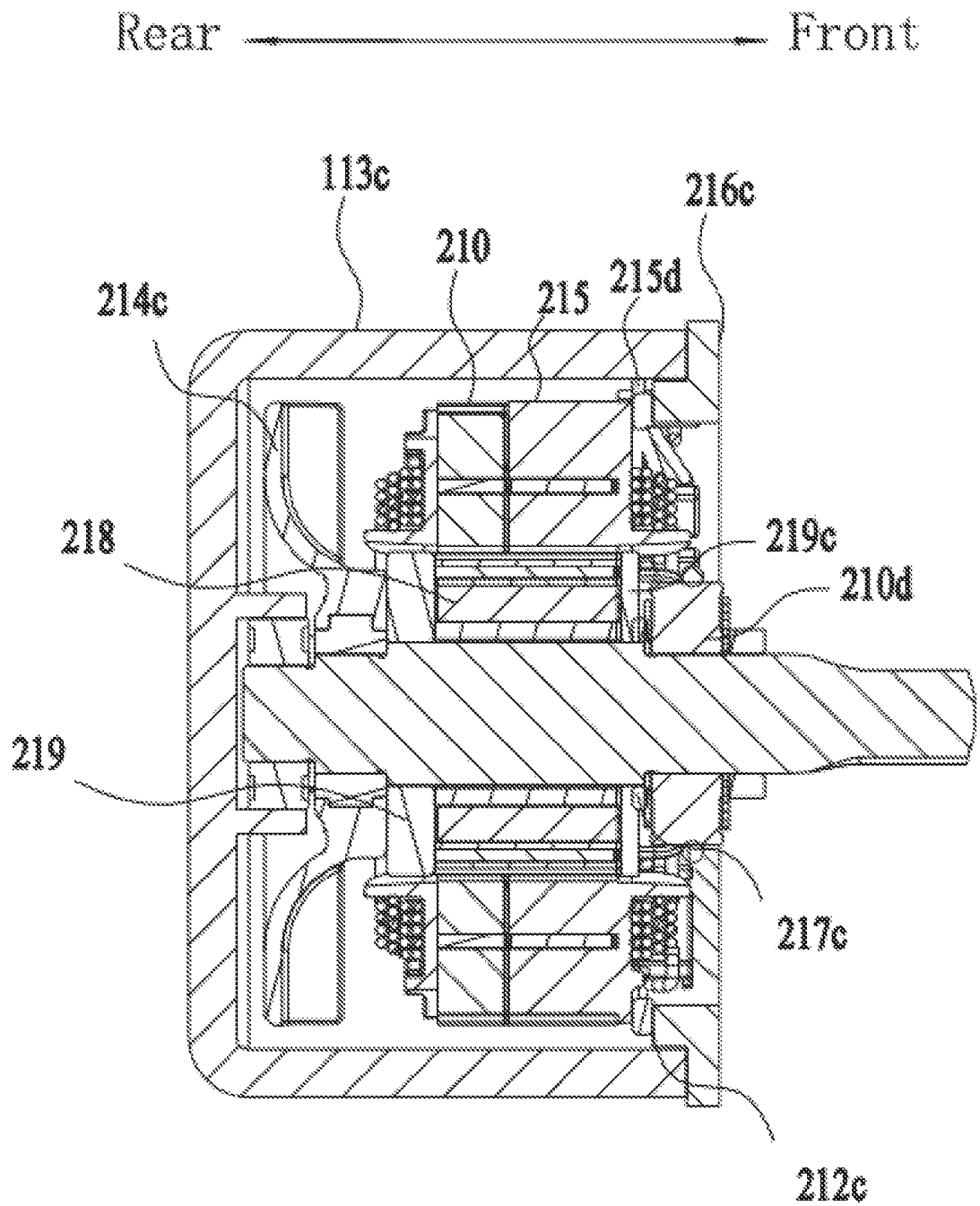
FIG. 18 is a partial sectional view of a handheld power tool as another example.

In some other examples, as shown in FIG. 18, the electric motor 210 is disposed in a rear housing 113c, and the electric motor 210 is configured to be the inrunner. The electric motor 210 includes the inner rotor 218 and the stator 215 disposed outside the rotor 218. A rotor front balance ring 219c is further disposed at a front end of the rotor 218. The electric motor 210 further includes a motor bearing 210d sleeved on an output shaft of the electric motor 210. A difference from some preceding examples lies in that a second elastic member 217c for limiting the rotor 218 in the front and rear direction is disposed between the rotor front balance ring 219c and the motor bearing 210d, and the fan 214c directly abuts against the rotor rear balance ring 219, thereby positioning the rotor 218 in the front and rear direction. A difference from some preceding examples also lies in a manner of positioning the stator 215 in the front and rear direction. As shown in FIG. 18, since the electric motor 210 is disposed in an accommodation space formed by the rear housing 113c in this example 11c, a stator platen 216c is disposed at the front end of the stator 215. Specifically, the stator platen 216c is disposed at a front end of the stator front end cover 215d. A first elastic member 212c is disposed between the stator platen 216c and the stator front end cover 215d so that the stator 215 is positioned in the front and rear direction.

Figure 19:
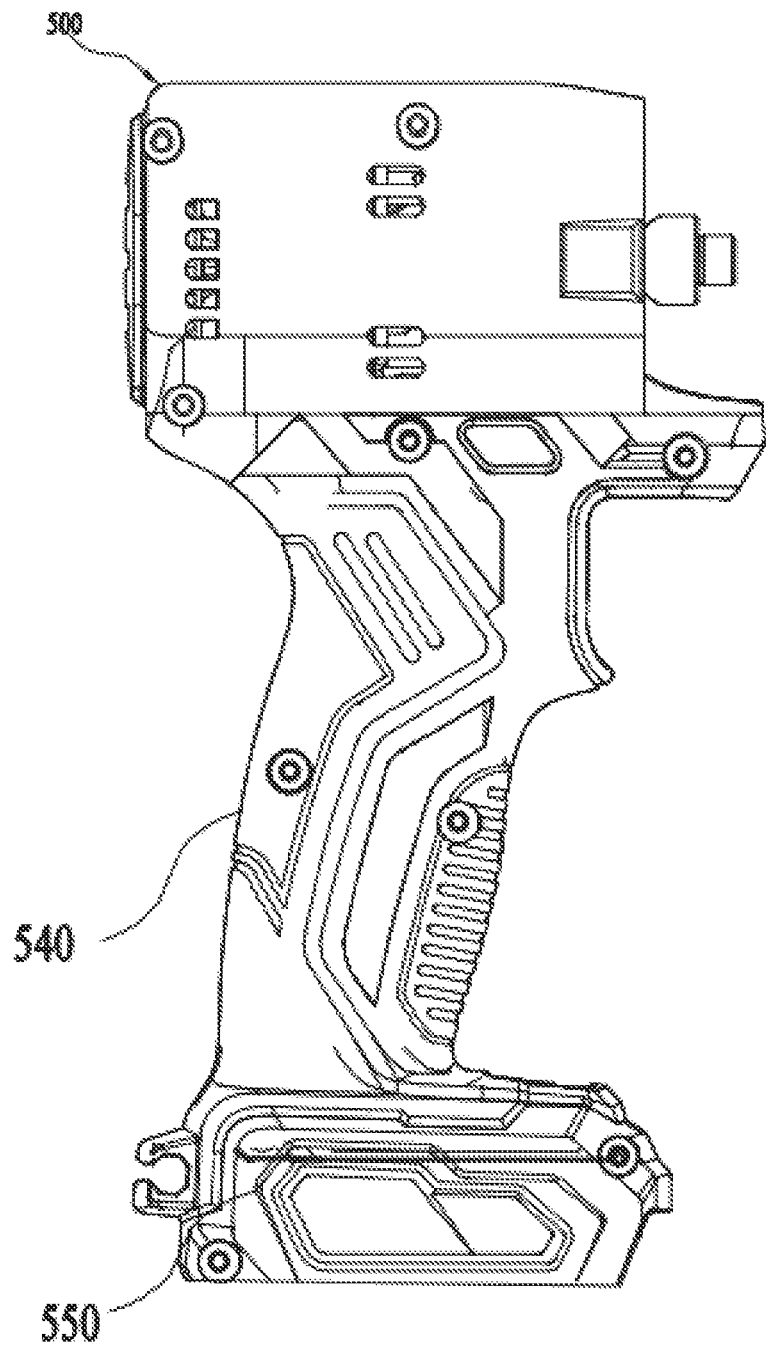
FIG. 19 is a structural view of an impact screwdriver according to the present application.

As shown in FIG. 19, the impact screwdriver includes an operation portion, a grip portion 540, and a power portion 550, where the operation portion is a main executing component of the impact screwdriver, and a working head can be detachably connected to the operation portion and the working head moves to complete various operations; the grip portion 540 is connected below the operation portion, is substantially perpendicular to the operation portion, and is used for a user to hold; and the power portion 550 is connected below the operation portion and used for supplying power to a motion of the working head. In this example, the power portion 550 is a battery pack detachably connected below the grip portion 540. Optionally, the battery pack is a lithium-ion battery pack with a high capacity density, which is conducive to increasing the endurance time of the impact screwdriver.

Figure 20:
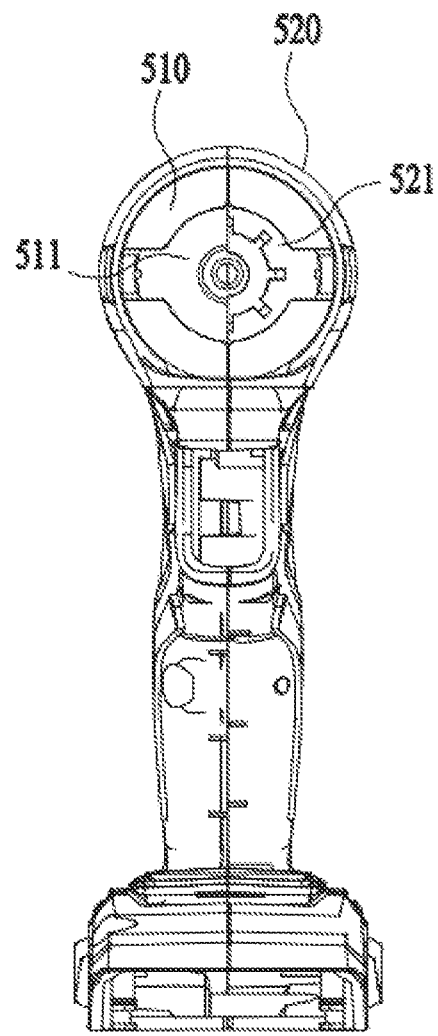
FIG. 20 is a first schematic view of a first half housing and a second half housing spliced according to the present application.
Figure 21:
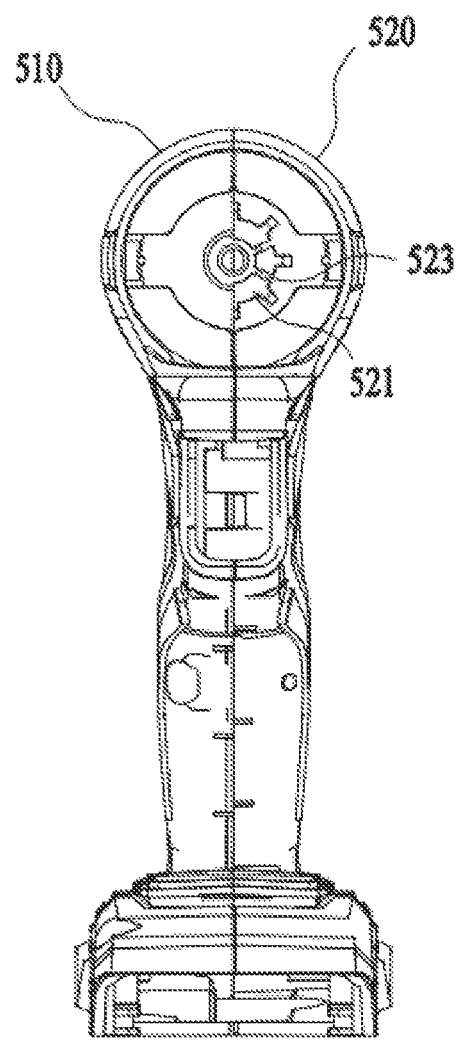
FIG. 21 is a second schematic view of a first half housing and a second half housing spliced according to the present application.

The impact screwdriver includes a housing 500 and an electric motor 600. The housing 500 has an accommodation space, and the electric motor 600 is disposed in the accommodation space inside the housing 500. The housing 500 is an appearance part of the operation portion. To facilitate the assembly of related parts for performing operations into the accommodation space inside the housing 500, as shown in FIGS. 20 and 21, the housing 500 is optionally configured to include a first half housing 510 and a second half housing 520 that are detachably connected to each other.

Optionally, the first half housing 510 and the second half housing 520 may be an upper half housing and a lower half housing split up and down in accordance with a horizontal plane, may be a left half housing and a right half housing split left and right in accordance with a vertical plane, or may be an inclined upper half housing and an inclined lower half housing split in accordance with an inclined plane oblique relative to a vertical direction. In this example, the left half housing and the right half housing are selected to facilitate assembly into the housing 500.

Specifically, the first half housing 510 includes a first rear end plate and a first arc-shaped wall, and a first protrusion 511 protrudes along a first direction (a direction a shown by a dash-dotted line in FIG. 22) on part of an inner wall surface of the first rear end plate facing the accommodation space. The second half housing 520 includes a second rear end plate and a second arc-shaped wall, and a second protrusion 521 protrudes along the first direction a on part of an inner wall surface of the second rear end plate facing the accommodation space. The first rear end plate and the second rear end plate are spliced into a rear end plate of the housing 500, the first arc-shaped wall and the second arc-shaped wall are spliced into an inner side wall of the housing 500, and the first protrusion 511 and the second protrusion 521 are spliced into a positioning protrusion. Optionally, the first rear end plate and the second rear end plate are both semi-circular, and the rear end plate of the spliced housing 500 is circular. Further optionally, the first protrusion 511 and the second protrusion 521 are each a half of a frustum, the frustum has vertical splicing surfaces, and two splicing surfaces overlap so that a frustum-shaped positioning protrusion can be spliced.

Figure 23:
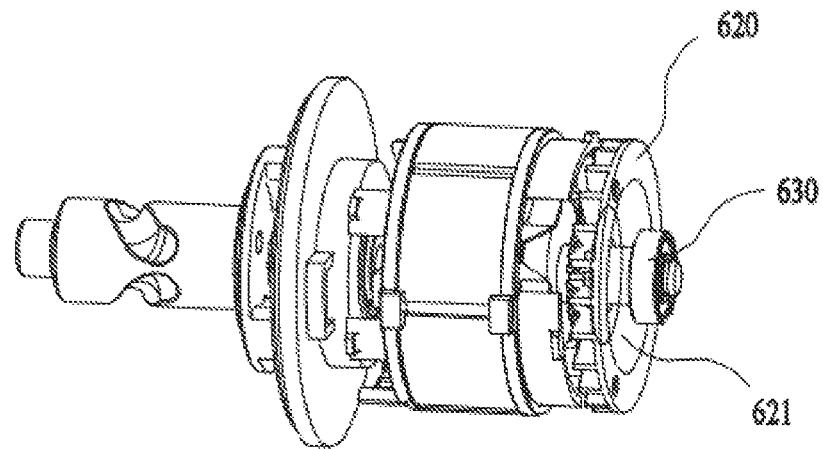
FIG. 23 is a structural view of an electric motor according to the present application.

The electric motor 600 disposed in the accommodation space includes a motor shaft 610 and a fan 620, where the motor shaft 610 extends along the first direction a. The motor shaft 610 has two end portions, an end portion facing the rear end plate of the housing 500 is defined as a rear end portion, and an end portion facing away from the rear end plate of the housing 500 is defined as a front end portion. The fan 620 is sleeved on the rear end portion of the motor shaft 610 facing the rear end plate. Moreover, as shown in FIG. 23, a positioning groove 621 is provided on a wall surface of the fan 620 facing the rear end plate. When the electric motor 600 is disposed inside the housing 500, the positioning protrusion is coplanar with the fan 620 or partially accommodated in the positioning groove 621. In this manner, the positioning protrusion can be avoided through the positioning groove 621 while the electric motor 600 is positioned, thereby effectively reducing the overall length of the impact screwdriver and facilitating the miniaturization of the impact screwdriver. As can be seen from a test, the overall size can be reduced by at least 1.5 mm in this manner.

Figure 22:
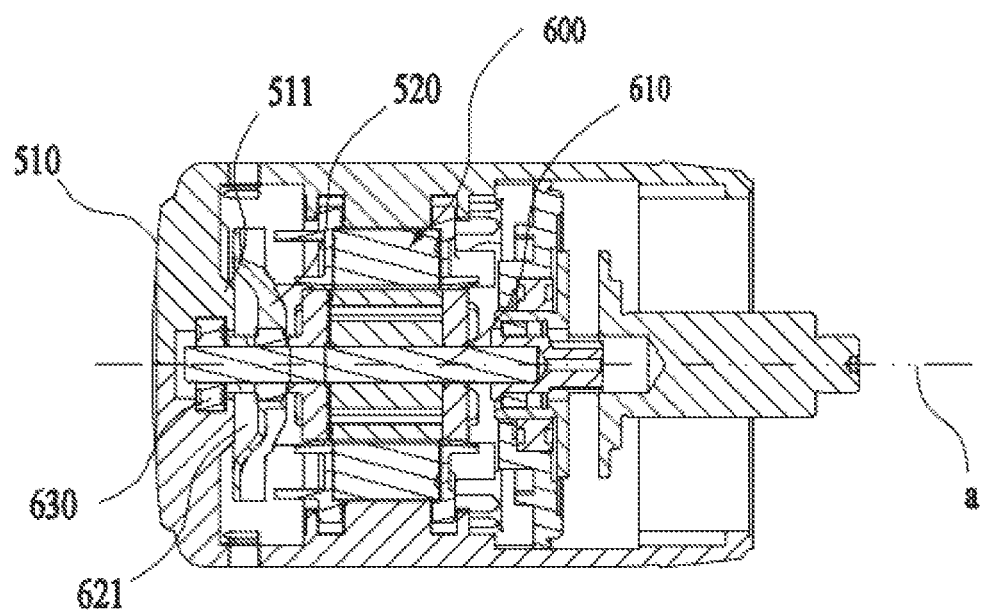
FIG. 22 is a sectional view of a housing and an electric motor according to the present application.
Figure 24:
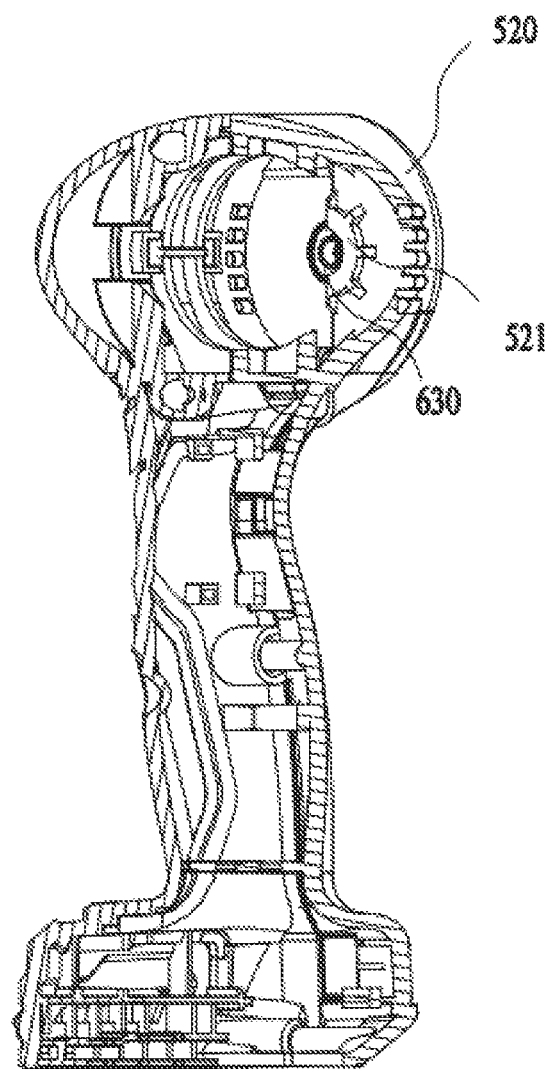
FIG. 24 is a partial sectional view of an impact screwdriver according to the present application.

Still referring to FIGS. 22 to 24, the electric motor 600 further includes a motor bearing 630 for supporting the stable rotation of the motor shaft 610, and the motor bearing 630 is sleeved on the motor shaft 610 and disposed on a side of the fan 620 facing the rear end plate. To stably support the motor bearing 630, the positioning protrusion is provided with a bearing chamber along the first direction a, and the motor bearing 630 is disposed in the bearing chamber. In this manner, an additional structure for supporting the motor bearing 630 does not need to be provided, which is conducive to simplifying the structure of the impact screwdriver, further shortening the overall length of the impact screwdriver, and the miniaturization of the impact screwdriver.

Figure 25:
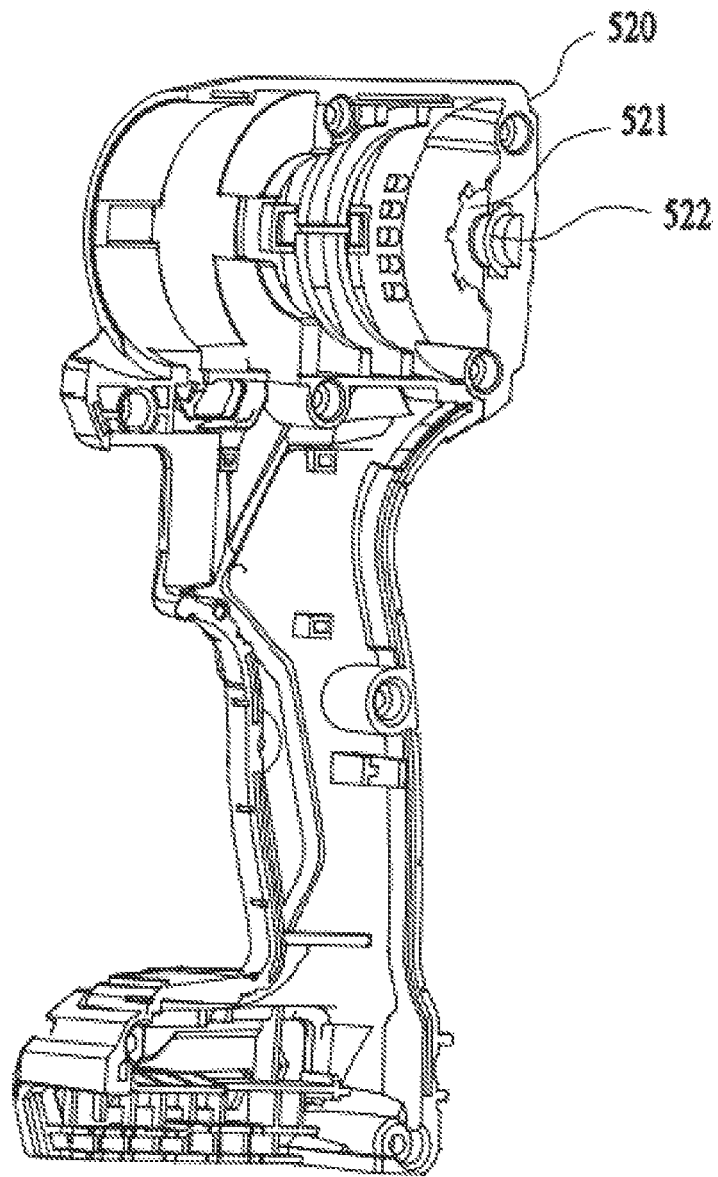
FIG. 25 is a first structural view of a second half housing according to the present application.
Figure 26:
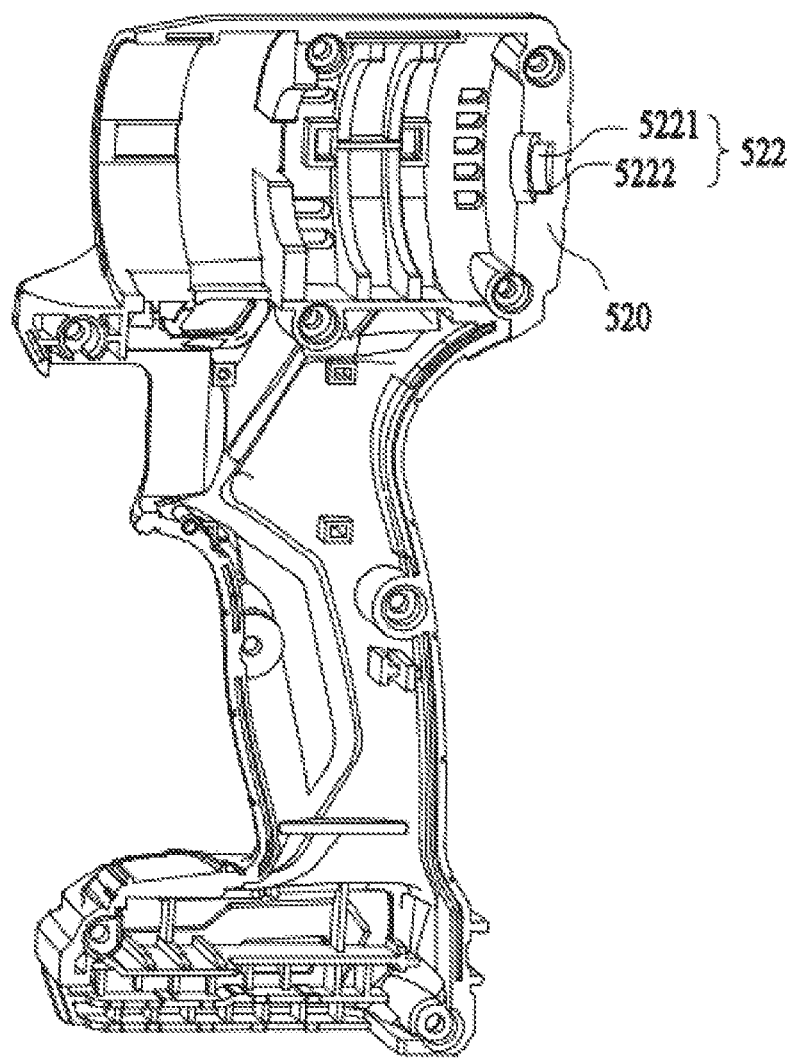
FIG. 26 is a second structural view of a second half housing according to the present application.
Figure 27:
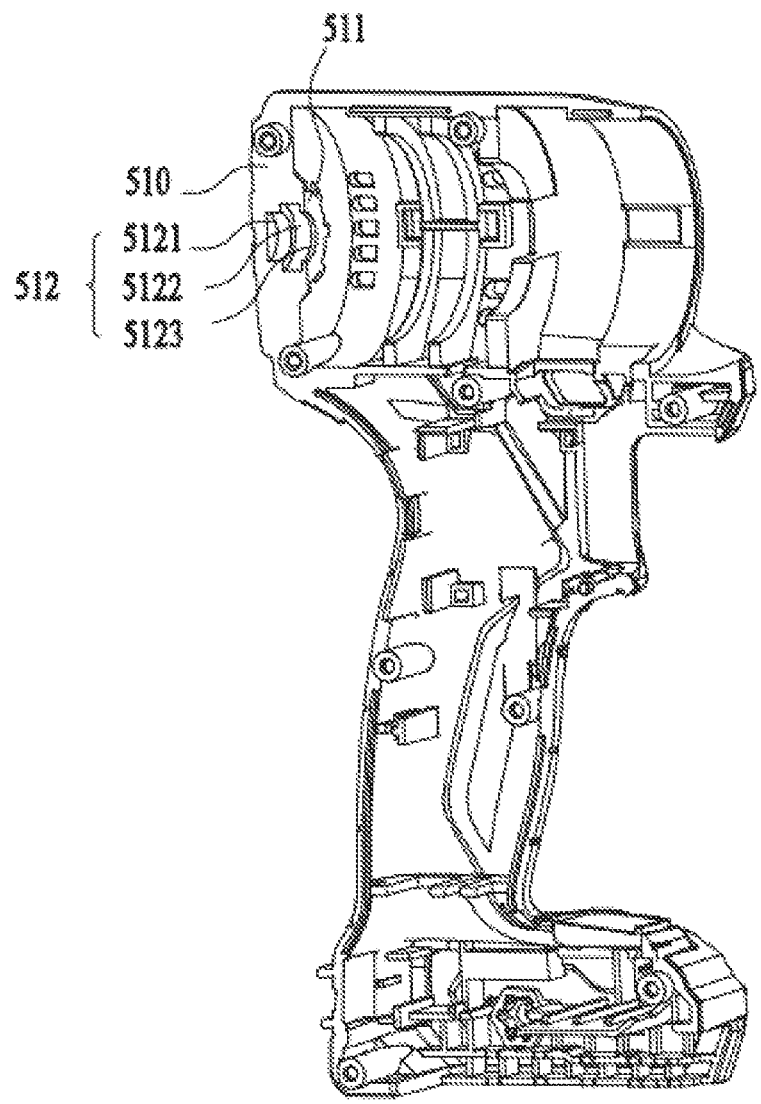
FIG. 27 is a first structural view of a first half housing according to the present application.
Figure 28:
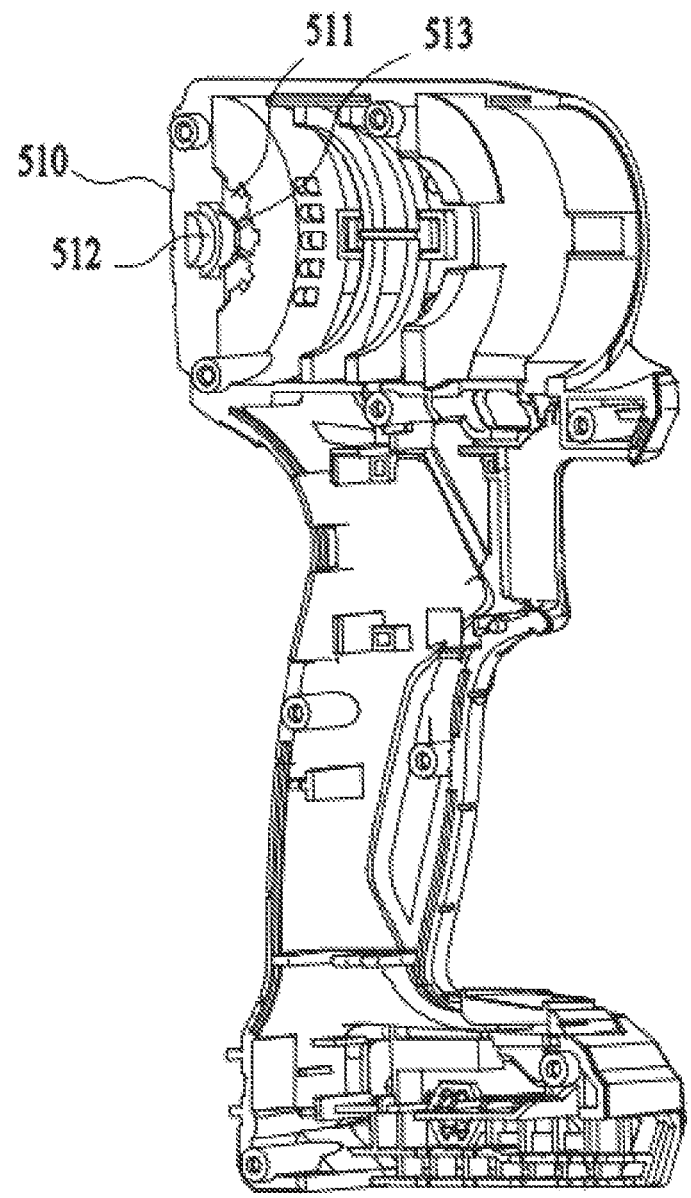
FIG. 28 is a second structural view of a first half housing according to the present application.

Specifically, since the first protrusion 511 and the second protrusion 521 are spliced into the positioning protrusion, to form the bearing chamber and reduce a difficulty in assembling the motor bearing 630 into the bearing chamber, as shown in FIGS. 27 and 28, the first protrusion 511 is provided with a first half chamber 512 having a side opening towards the second protrusion 521, that is, the side opening of the first half chamber 512 is located on a splicing surface of the first protrusion 511, and the first half chamber 512 extends towards the inside of the first protrusion 511 along a radial direction of the first protrusion 511. Similarly, as shown in FIGS. 25 and 26, the second protrusion 521 is provided with a second half chamber 522 having a side opening towards the first protrusion 511, that is, the side opening of the second half chamber 522 is located on a splicing surface of the second protrusion 521, and the second half chamber 522 extends towards the inside of the second protrusion 521 along a radial direction of the second protrusion 521. After the side opening of the first half chamber 512 and the side opening of the second half chamber 522 overlap, the first half chamber 512 and the second half chamber 522 may form the bearing chamber.

Optionally, the first half chamber 512 and the second half chamber 522 may each be a semi-enclosed structure shown in FIGS. 25 and 27 or an open structure shown in FIG. 26. Alternatively, one of the first half chamber 512 and the second half chamber 522 may be the semi-enclosed structure shown in FIGS. 25 and 27, and the other of the first half chamber 512 and the second half chamber 522 may be the open structure as shown in FIG. 26.

Still referring to FIG. 26, the second half chamber 522 (or the first half chamber 512) with the open structure includes a first accommodation portion 5221 and a second accommodation portion 5222 communicating in a step shape. The first accommodation portion 5221 is used for accommodating an end portion of the motor shaft 610. Specifically, the first accommodation portion 5221 includes a first half bottom surface and a first half arc-shaped surface perpendicularly surrounding the first half bottom surface along a circumferential direction of the first half bottom surface and extending towards the second accommodation portion 5222, where the first half bottom surface is perpendicular to the first direction a and used for limiting the rear end portion of the motor shaft 610, and the first half arc-shaped surface is used for surrounding part of a space for accommodating the end portion of the motor shaft 610.

The second accommodation portion 5222 has a greater dimension than the first accommodation portion 5221 and is used for accommodating the motor bearing 630. Specifically, the second accommodation portion 5222 includes a first abutting surface and a first arc-shaped inner wall surface, the first abutting surface is perpendicular to the first direction a and used for abutting against a rear end surface of the motor bearing 630, and the first arc-shaped inner wall surface is disposed around the first direction a and used for abutting against an outer wall surface of the motor bearing 630, and an end of the first arc-shaped inner wall surface facing away from the first abutting surface is connected to an end surface of the positioning protrusion.

That is to say, the half chamber with a semi-open structure forms an opening on the end surface at the top of the positioning protrusion, and when both the two half chambers have semi-open structures, openings of the two half chambers can be spliced into an entry allowing the motor bearing 630 to enter the bearing chamber. The half chamber configured in this manner is simple in structure and can provide an alternative for the motor bearing 630 to enter the bearing chamber, which is conducive to reducing the difficulty of assembly. The motor bearing 630 can enter the bearing chamber through the entry; instead, the motor bearing 630 can be directly positioned between the first half chamber 512 and the second half chamber 522 to be directly disposed in the bearing chamber when the first half housing 510 and the second half housing 520 are spliced into the housing 500.

Still referring to FIG. 27, the first half chamber 512 (or the second half chamber 522) with the semi-enclosed structure includes a third accommodation portion 5121, a fourth accommodation portion 5122, and a fifth accommodation portion 5123 connected in sequence. The third accommodation portion 5121 is used for accommodating the end portion of the motor shaft 610. Specifically, the third accommodation portion 5121 includes a second half bottom surface and a second half arc-shaped surface perpendicularly surrounding the second half bottom surface along a circumferential direction of the second half bottom surface and extending towards the fourth accommodation portion 5122, where the second half bottom surface is perpendicular to the first direction a and used for limiting the rear end portion of the motor shaft 610, and the second half arc-shaped surface is used for surrounding part of the space for accommodating the end portion of the motor shaft 610.

The fourth accommodation portion 5122 is used for accommodating the motor bearing 630 and includes a second abutting surface, a second arc-shaped inner wall surface, and a third abutting surface connected in a U shape. The second abutting surface and the third abutting surface are perpendicular to the first direction a and abut against the rear end surface and a front end surface of the motor bearing 630, respectively, and the second arc-shaped inner wall surface is disposed around the first direction a and used for abutting against the outer wall surface of the motor bearing 630. The fifth accommodation portion 5123 includes a third arc-shaped inner wall surface, and the third arc-shaped inner wall surface is connected to the third abutting surface and the end surface of the positioning protrusion.

Compared with the open structure, the half chamber with the semi-enclosed structure can limit both the front end face and the rear end face of the motor bearing 630 and has better support stability due to the capability of stably supporting the motor bearing 630. When both the two half chambers have semi-enclosed structures, the motor bearing 630 can only be positioned between the first half chamber 512 and the second half chamber 522 so that the motor bearing 630 is directly disposed within the bearing chamber when the first half housing 510 and the second half housing 520 are spliced into the housing 500.

It is to be noted that when the half chambers on the two protrusions have different structures, the first accommodation portion 5221 corresponds to the third accommodation portion 5121, that is, the second half bottom surface and the first half bottom surface may be spliced into a complete bottom surface of the bearing chamber, and the second half arc-shaped surface and the first half arc-shaped surface may be spliced into the space for accommodating the end portion of the motor shaft 610. The second accommodation portion 5222 corresponds to the fourth accommodation portion 5122 and the fifth accommodation portion 5123, the second abutting surface and the first abutting surface may be spliced into a complete ring-shaped surface to abut against part of the rear end surface of the motor bearing 630, the second arc-shaped inner wall surface and part of a wall surface of the first arc-shaped inner wall surface are spliced into a space for accommodating the motor bearing 630, and the third abutting surface in the shape of a half ring abuts against the front end surface of the motor bearing 630 alone. The third arc-shaped inner wall surface and the rest of the first arc-shaped inner wall surface are spliced into a space for avoiding part of the motor shaft 610 on the other side of the motor bearing 630.

As shown in FIG. 28, the first protrusion 511 is provided with first hollow grooves 513 along the radial direction, which communicate with the first half chamber 512. In this manner, not only can the weight of the housing 500 be reduced, but also the heat dissipation of the motor bearing 630 during operation is facilitated. Optionally, multiple first hollow grooves 513 are provided, which are arranged radially on the first protrusion 511.

Further, still referring to FIG. 21, the second protrusion 521 is provided with second hollow grooves 523 along the radial direction, which communicate with the second half chamber 522. Optionally, multiple second hollow grooves 523 are provided, which are arranged radially on the second protrusion 521.

It is to be noted that no matter whether the half chambers on the first protrusion 511 and the second protrusion 521 have the semi-enclosed structure or the open structure, the arrangement of the above hollow grooves is not affected.

To ensure the structural strength of the first protrusion 511 and the second protrusion 521, reinforcing ribs may be provided in a circumferential direction of the first protrusion 511 and the second protrusion 521, multiple reinforcing ribs are provided, and the multiple reinforcing ribs are radially arranged so that the structural strength of the protrusions is uniformly enhanced.

Figure 29:
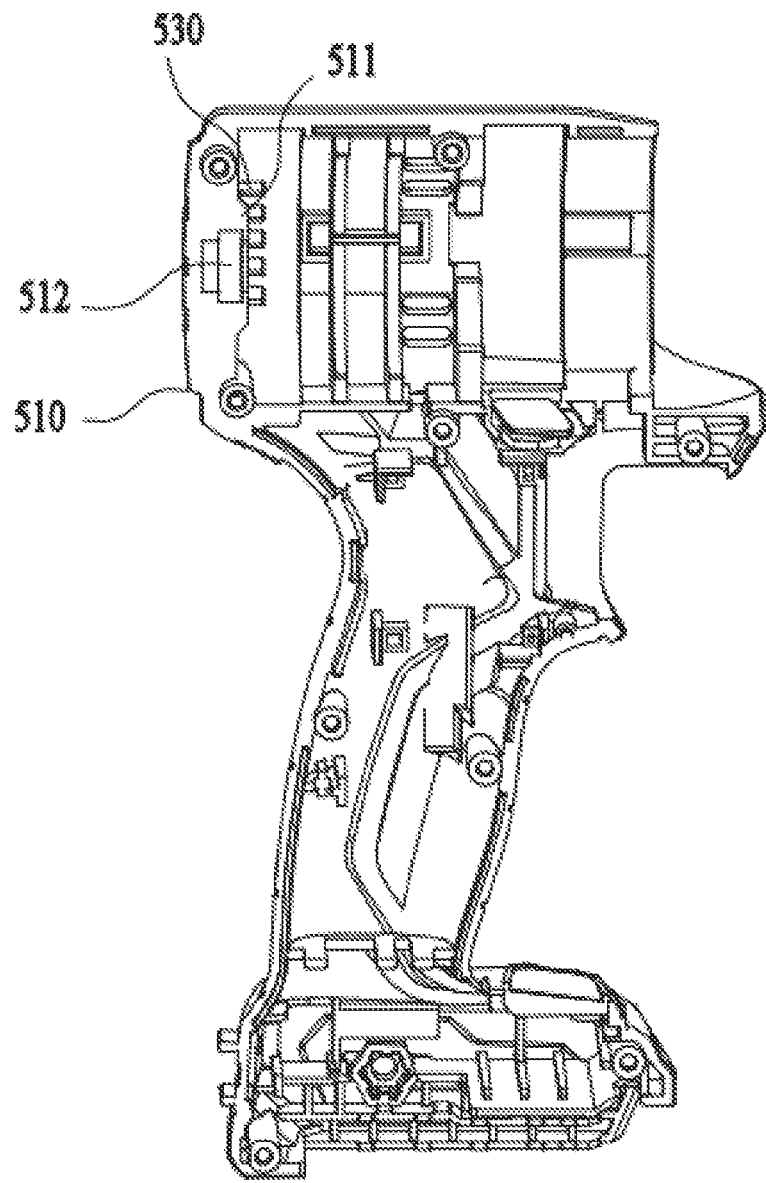
FIG. 29 is a structural view in which a projection of air vents in a first direction partially overlaps a projection of a first protrusion in the first direction according to the present application.

As shown in FIG. 29, the housing 500 is provided with air vents 530, where the arrangement of the air vents 530 is conducive to the heat dissipation of the electric motor 600 during operation. In this example, a projection of the air vents 530 on a plane parallel to the first direction a at least partially overlaps a projection of the positioning protrusion on the plane parallel to the first direction a, which is conducive to further reducing the overall size of the impact screwdriver.

Optionally, multiple air vents 530 are provided, which are spaced apart on the housing 500 along a circumferential direction around the first direction a. The air vent 530 may be an elongated hole in the shape of a waist, a rectangle, or an ellipse.

Example One

Figure 30:
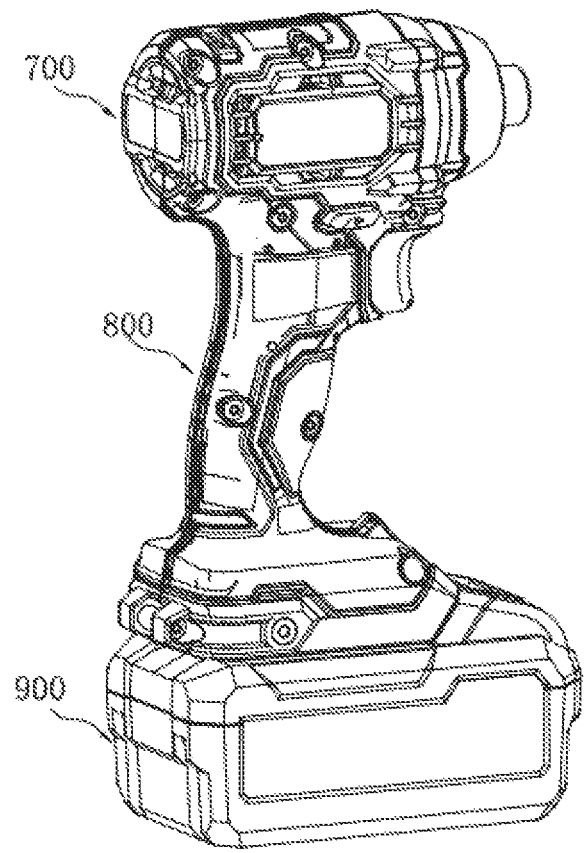
FIG. 30 is a structural view of an impact screwdriver according to the present application.

This example provides an impact screwdriver that can assist in punching, screwing, and other tasks. As shown in FIG. 30, the impact screwdriver includes an operation portion 700, a handheld portion 800, and a battery portion 900, where the operation portion 700 is a main executing component of the impact screwdriver, and a working head can be detachably connected to the operation portion and the working head moves to complete various operations; the handheld portion 800 is connected below the operation portion 700, is substantially perpendicular to the operation portion 700, and is used for a user to hold; and the battery portion 900 is connected below the operation portion 700 and used for supplying power to a motion of the working head.

Figure 31:
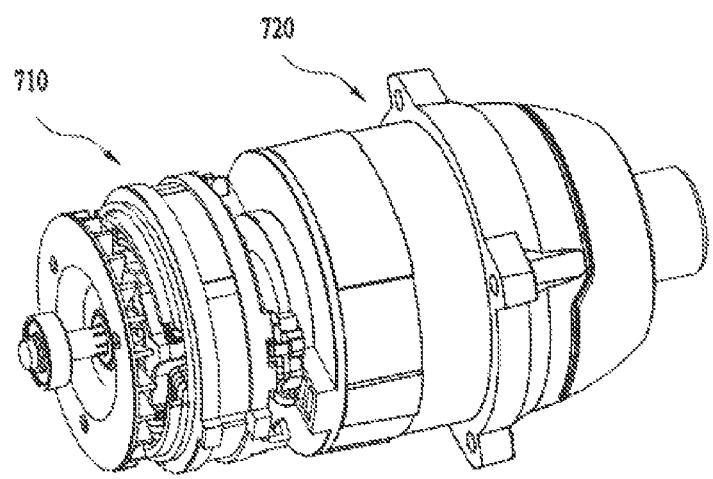
FIG. 31 is a structural view of an electric motor and a gearbox of an impact screwdriver according to the present application.
Figure 32:
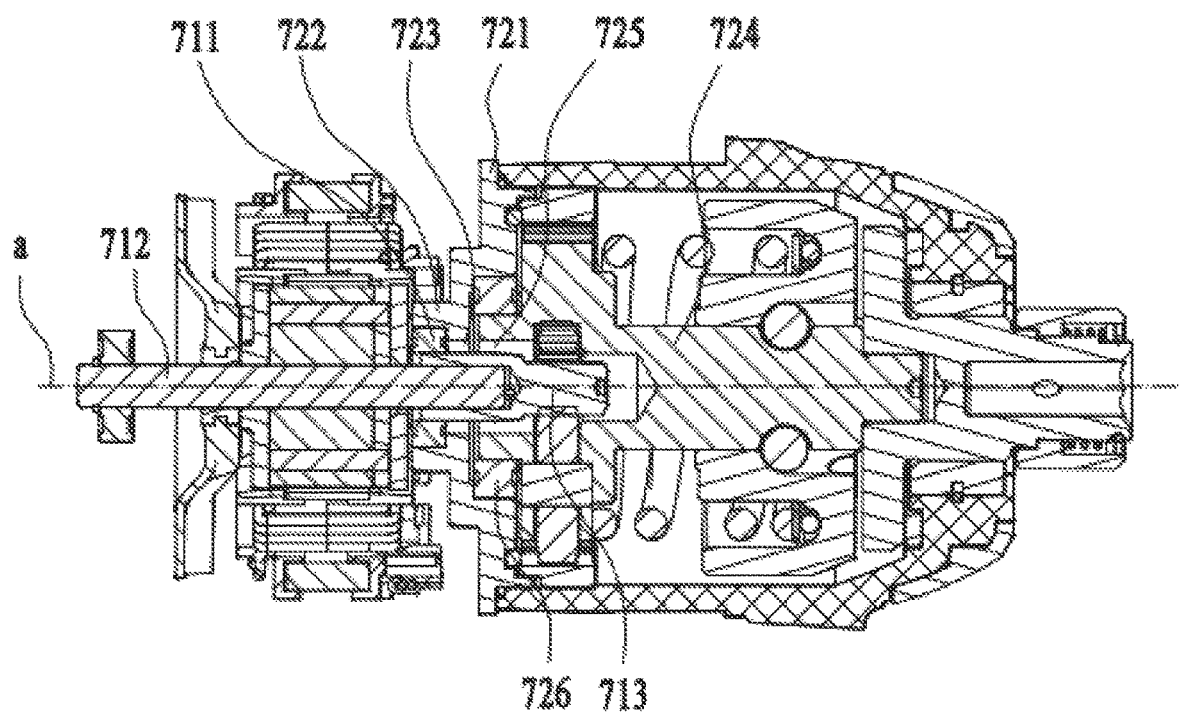
FIG. 32 is a sectional view of an electric motor and a gearbox of an impact screwdriver according to example one of the present application.
Figure 33:
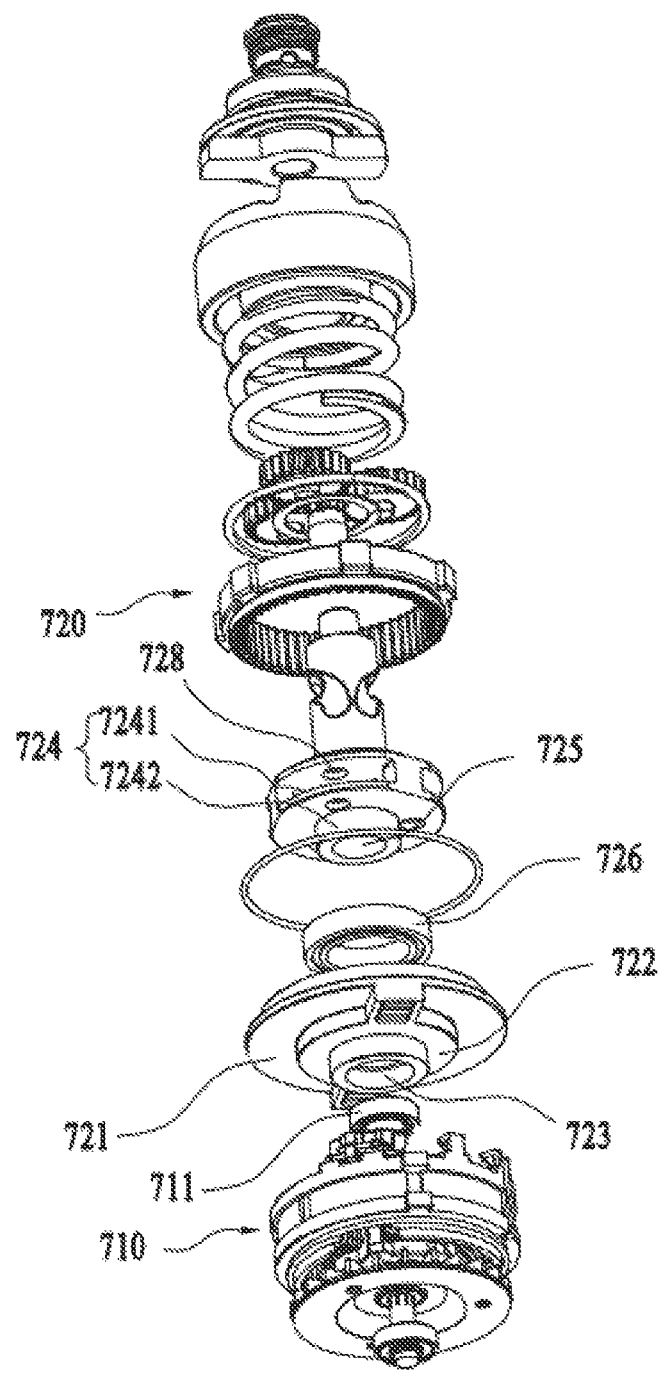
FIG. 33 is an exploded view of an electric motor and a gearbox of an impact screwdriver according to example one of the present application.

As shown in FIGS. 31 to 33, the operation portion 700 includes a housing, an electric motor 710, and a gearbox 720, where an accommodation space is formed in the housing, and both the electric motor 710 and the gearbox 720 are disposed in the housing. The electric motor 710 includes a motor shaft 712 extending along a first direction a in the accommodation space. A front bearing 711 is sleeved at a front end of the motor shaft 712. The motor shaft 712 has two end portions, where an end portion facing the gearbox 720 is referred to as the front end, and an end portion facing away from the gearbox 720 is referred to as a rear end.

The gearbox 720 is disposed parallel to the electric motor 710 along the first direction a. The gearbox 720 includes a rear cover 721, where a protruding structure 722 protrudes along the first direction a on the rear cover 721, and a first through hole 723 penetrates through the protruding structure 722 along the first direction a. The front end of the motor shaft 712 penetrates through the first through hole 723 and is disposed inside the gearbox 720. At least part of the front bearing 711 is disposed within the first through hole 723, and at least part of an outer wall surface of the front bearing 711 abuts against an inner wall surface of the first through hole 723.

In this example, the impact screwdriver is provided with the protruding structure 722 on the rear cover 721 of the gearbox 720, the first through hole 723 penetrates through the protruding structure 722, and the front bearing 711 of the electric motor 710 is accommodated and carried in the first through hole 723 so that the rear cover 721 of the gearbox 720 can also serve as a bearing mount of the electric motor 710. In this manner, the bearing mount does not need to be additionally disposed, thereby simplifying the structure of the whole impact screwdriver, shortening the overall length of the impact screwdriver, and improving a grip ability and user experience.

Specifically, in this example, the protruding structure 722 protrudes towards the electric motor 710 along the first direction a, and the length of the protruding structure 722 in the first direction a is greater than or equal to the length of the front bearing 711 in the first direction a. More specifically, still referring to FIG. 32, the first through hole 723 is a stepped hole and includes a first hole with a larger dimension and a second hole with a smaller dimension, the first hole is closer to the electric motor 710, and the first hole has a dimension adapting to a dimension of the front bearing 711 and is used for accommodating the front bearing 711; and the second bore has a dimension smaller than the dimension of the front bearing 711 and larger than a dimension of the motor shaft 712 and is used for the motor shaft 712 to penetrate through to enter the gearbox 720. In this example, the whole front bearing 711 is disposed within the first through hole 723, and the rear cover 721 supports the front bearing 711 with relatively high stability.

Further, the gearbox 720 also includes a main shaft 724 extending along the first direction a, an end of the main shaft 724 facing the rear cover 721 is a rear end of the main shaft 724, the rear end of the main shaft 724 is provided with an assembly hole 725 along the first direction a, and the front end of the motor shaft 712 is disposed within the assembly hole 725. In this manner, the overall length of the impact screwdriver can be further shortened. It is to be noted that a planet gear mechanism is disposed in the main shaft 724, and the motor shaft 712 is drivingly connected to a sun gear of the planet gear mechanism to drive the sun gear to rotate. The planet gear mechanism further includes planet gears meshing with the sun gear. In this example, the number of planet gears is three, and three planet gears are uniformly distributed along a circumferential direction of the sun gear.

Optionally, still referring to FIGS. 32 and 33, the main shaft 724 includes a body portion 7241 and a ring-shaped protrusion portion 7242 connected in a step shape. The body portion 7241 is used for accommodating the planet gear mechanism, the whole body portion 7241 is in the shape of a circular platform and provided with the assembly hole 725 along the direction of a first axis a, and the assembly hole 725 extends towards the ring-shaped protrusion portion 7242 and penetrates through the ring-shaped protrusion portion 7242. Three planet gear accommodation cavities are provided inside the body portion 7241 along a direction around the assembly hole 725, and the three planet gear accommodation cavities penetrate through an outer wall surface of the body portion 7241 along a radial direction of the body portion 7241. The three planet gears are disposed in the three planet gear accommodation cavities separately, and a front end and a rear end of the body portion 7241 on two sides of the planet gear accommodation cavities are each provided with three pin shaft holes 728. A pin shaft penetrates through front and rear corresponding pin shaft holes 728, and the planet gears are rotatably connected in the planet gear accommodation cavities through pin shafts. Portions of the planet gears protruding out of the planet gear accommodation cavities mesh with a ring gear of the planet gear mechanism.

Further, the ring-shaped protrusion portion 7242 is in the shape of a circular platform and has a smaller dimension than the body portion 7241 so that an outer wall surface of the ring-shaped protrusion portion 7242 and a rear end surface of the body portion 7241 form a bearing mounting groove. Still referring to FIG. 32, the gearbox 720 further includes a main shaft lower bearing 726 sleeved on the ring-shaped protrusion portion 7242 of the main shaft 724 and disposed within the bearing mounting groove. The main shaft lower bearing 726 can effectively and stably support the main shaft 724 so that the main shaft 724 can rotate stably.

It is to be noted that in this example, since the protruding structure 722 protrudes away from the planet gear mechanism, the ring-shaped protrusion portion 7242 may be designed with a relatively small dimension, and the front end and the rear end of the body portion 7241 have sufficient space for providing the pin shaft holes 728 so that the pin shaft holes 728 and the ring-shaped protrusion portion 7242 are independent of each other and do not interfere with each other.

Figure 34:
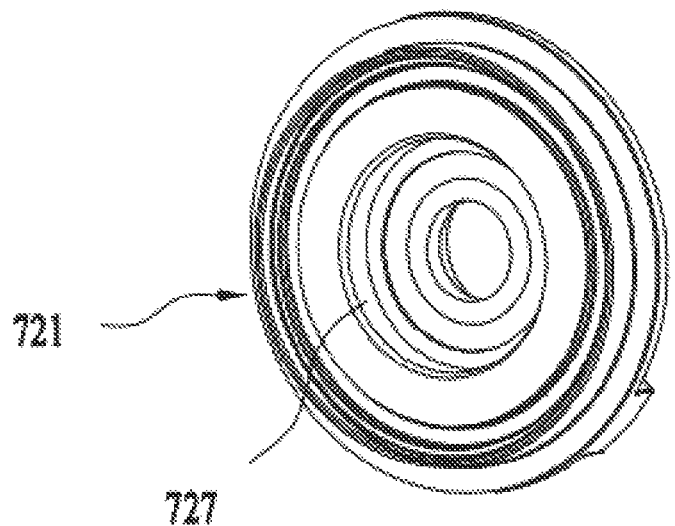
FIG. 34 is a structural view illustrating a rear cover of an impact screwdriver according to example one of the present application from a certain angle.

Optionally, as shown in FIG. 34, a bearing mounting cavity 727 communicating with the first through hole 723 is provided inside the rear cover 721 of the gearbox 720, the bearing mounting cavity 727 includes a ring-shaped surface and an abutting surface, the abutting surface is perpendicular to the first direction a, the ring-shaped surface is disposed around the first direction a, and an end of the abutting surface facing away from the ring-shaped surface is connected to the inner wall surface of the first through hole 723. The main shaft lower bearing 726 is disposed in the bearing mounting cavity 727, a rear end surface of the main shaft lower bearing 726 abuts against the abutting surface, and an outer wall surface of the main shaft lower bearing 726 abuts against the ring-shaped surface.

Figure 35:
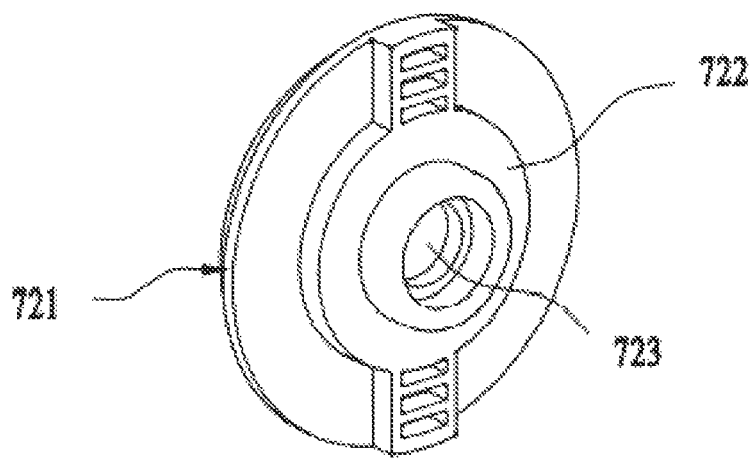
FIG. 35 is a structural view illustrating a rear cover of an impact screwdriver according to example one of the present application from another angle.

Further optionally, as shown in FIG. 35, the whole rear cover 721 is in the shape of a multi-stage stepped column so that various positions of the rear cover 721 have substantially the same wall thickness, so as to reduce a space occupied by the rear cover 721 in the impact screwdriver and reduce a weight and manufacturing costs. To ensure the structural strength of the rear cover 721, reinforcing bosses may be provided at a second step of the rear cover 721.

To further shorten the overall length of the impact screwdriver, part or all of the rear cover 721 of the gearbox 720 may be embedded into a stator of the electric motor 710, and the rear cover 721 in the shape of the multi-stage stepped column can effectively avoid a structure in the stator of the electric motor 710, thereby reducing a difficulty in embedding the rear cover 721 into the stator of the electric motor 710.

Example Two

This example provides an impact screwdriver which also includes an operation portion 700, a handheld portion 800, and a battery portion 900. The handheld portion 800 and the battery portion 900 are basically the same as those in example one, and a difference only lies in the operation portion 700.

Figure 36:
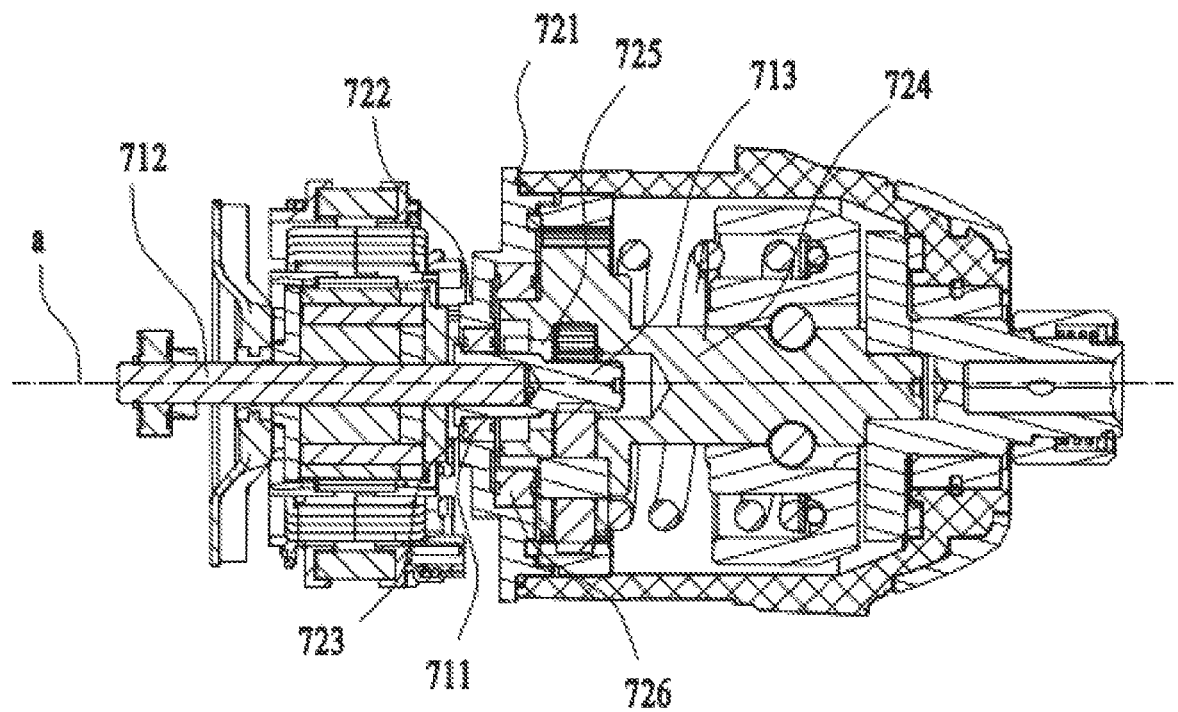
FIG. 36 is a sectional view of an electric motor and a gearbox of an impact screwdriver according to example two of the present application.

As shown in FIG. 36, the operation portion 700 includes a housing, an electric motor 710, and a gearbox 720, where an accommodation space is formed in the housing, and both the electric motor 710 and the gearbox 720 are disposed in the housing. The electric motor 710 includes a motor shaft 712 extending along a first direction a in the accommodation space. A front bearing 711 is sleeved at a front end of the motor shaft 712. The motor shaft 712 has two end portions, where an end portion facing the gearbox 720 is referred to as the front end, and an end portion facing away from the gearbox 720 is referred to as a rear end.

The gearbox 720 is disposed parallel to the electric motor 710 along the first direction a. The gearbox 720 includes a rear cover 721, where a protruding structure 722 protrudes along the first direction a on the rear cover 721, and a first through hole 723 penetrates through the protruding structure 722 along the first direction a. The front end of the motor shaft 712 penetrates through the first through hole 723 and is disposed inside the gearbox 720. At least part of the front bearing 711 is disposed within the first through hole 723, and at least part of an outer wall surface of the front bearing 711 abuts against an inner wall surface of the first through hole 723.

In this example, the impact screwdriver is provided with the protruding structure 722 on the rear cover 721 of the gearbox 720, the first through hole 723 penetrates through the protruding structure 722, and the front bearing 711 of the electric motor 710 is accommodated and carried in the first through hole 723 so that the rear cover 721 of the gearbox 720 can also serve as a bearing mount of the electric motor 710. In this manner, the bearing mount does not need to be additionally disposed, thereby simplifying the structure of the whole impact screwdriver, shortening the overall length of the impact screwdriver, and improving a grip ability and user experience.

Figure 37:
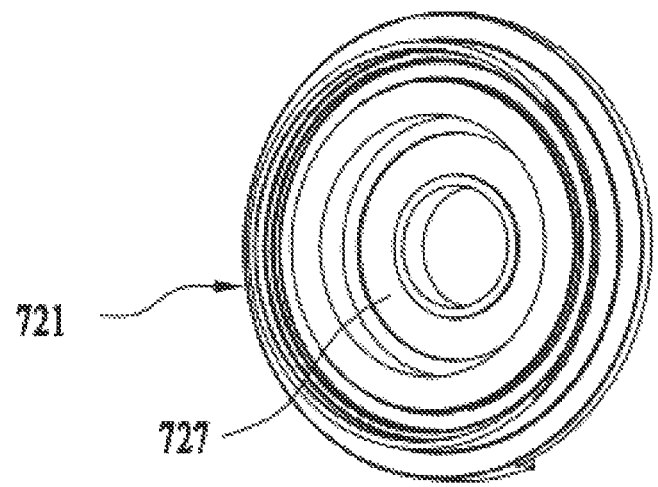
FIG. 37 is a structural view illustrating a rear cover of an impact screwdriver according to example two of the present application from a certain angle.
Figure 38:
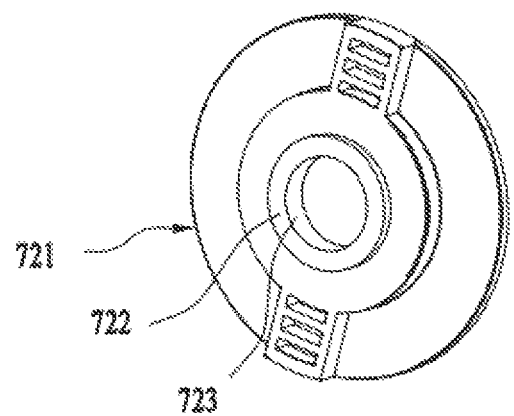
FIG. 38 is a structural view illustrating a rear cover of an impact screwdriver according to example two of the present application from another angle.

Specifically, in this example, as shown in FIGS. 37 and 38, the protruding structure 722 protrudes towards the electric motor 710 along the first direction a. Compared with the protruding structure 722 in example one, the protruding structure 722 in this example has a relatively small dimension. Specifically, the length of the protruding structure 722 in this example in the first direction a is smaller than the length of the front bearing 711 in the first direction a. More specifically, in this example, the first through hole 723 is a through hole with an unchanged inner diameter, a rear end of the front bearing 711 is disposed within the first through hole 723, and a front end of the front bearing 711 protrudes out of the first through hole 723 and is disposed inside the gearbox 720.

Further, the gearbox 720 also includes a main shaft 724 extending along the first direction a, an end of the main shaft 724 facing the rear cover 721 is a rear end of the main shaft 724, the rear end of the main shaft 724 is provided with an assembly hole 725 along the first direction a, the front end of the motor shaft 712 is disposed within the assembly hole 725, and the front end of the front bearing 711 is also disposed within the assembly hole 725. In this manner, the overall length of the impact screwdriver can be further shortened.

It is to be noted that a planet gear mechanism is disposed in the main shaft 724, and the motor shaft 712 is drivingly connected to a sun gear of the planet gear mechanism to drive the sun gear to rotate. The planet gear mechanism further includes planet gears meshing with the sun gear. In this example, the number of planet gears is three, and three planet gears are uniformly distributed along a circumferential direction of the sun gear.

Figure 39:
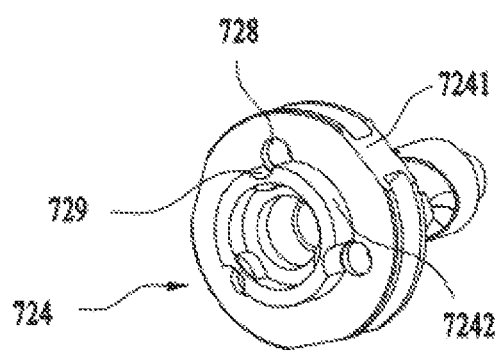
FIG. 39 is a structural view illustrating a main shaft of an impact screwdriver according to example two of the present application from a certain angle.
Figure 40:
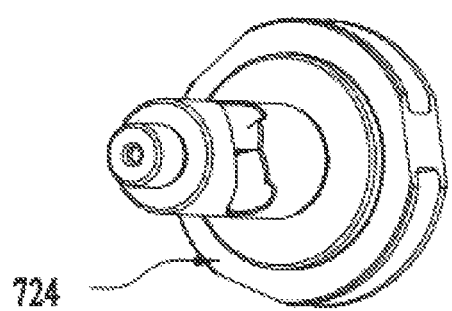
FIG. 40 is a structural view illustrating a main shaft of an impact screwdriver according to example two of the present application from another angle.

Optionally, still referring to FIGS. 39 and 40, the main shaft 724 includes a body portion 7241 and a ring-shaped protrusion portion 7242 connected in a step shape. The body portion 7241 is used for accommodating the planet gear mechanism, the whole body portion 7241 is in the shape of a circular platform and provided with the assembly hole 725 along the direction of a first axis a, and the assembly hole 725 extends towards the ring-shaped protrusion portion 7242 and penetrates through the ring-shaped protrusion portion 7242. Three planet gear accommodation cavities are provided inside the body portion 7241 along a direction around the assembly hole 725, and the three planet gear accommodation cavities penetrate through an outer wall surface of the body portion 7241 along a radial direction of the body portion 7241. The three planet gears are disposed in the three planet gear accommodation cavities separately, and a front end and a rear end of the body portion 7241 on two sides of the planet gear accommodation cavities are each provided with three pin shaft holes 728. A pin shaft penetrates through front and rear corresponding pin shaft holes 728, and the planet gears are rotatably connected in the planet gear accommodation cavities through pin shafts. Portions of the planet gears protruding out of the planet gear accommodation cavities mesh with a ring gear of the planet gear mechanism.

Further, the ring-shaped protrusion portion 7242 is in the shape of a circular platform and has a smaller dimension than the body portion 7241 so that an outer wall surface of the ring-shaped protrusion portion 7242 and a rear end surface of the body portion 7241 form a bearing mounting groove. Still referring to FIG. 36, the gearbox 720 further includes a main shaft lower bearing 726 sleeved on the ring-shaped protrusion portion 7242 of the main shaft 724 and disposed within the bearing mounting groove. The main shaft lower bearing 726 can effectively and stably support the main shaft 724 so that the main shaft 724 can rotate stably. To further reduce the overall length of the impact screwdriver, a projection of the main shaft lower bearing 726 on a plane parallel to the first direction a may at least partially overlap a projection of the front bearing 711 on the plane parallel to the first direction a.

It is to be noted that compared with the ring-shaped protrusion portion 7242 in example one, the ring-shaped protrusion portion 7242 in this example needs to have an appropriately increased dimension since the front end of the front bearing 711 needs to be disposed within the assembly hole 725. Since the overall size of the main shaft 724 is unchanged, an increase of the ring-shaped protrusion portion 7242 inevitably causes the area of an end surface of the body portion 7241 for providing the pin shaft holes 728 to be reduced. To mount the pin shafts, still referring to FIGS. 39 and 40, positions of the pin shaft holes 728 on the body portion 7241 remain unchanged, and the ring-shaped protrusion portion 7242 is provided with avoidance grooves 729 for avoiding the pin shafts, where each of the avoidance grooves 729 communicates with part of a respective one of the pin shaft holes 728.

To ensure the structural strength of the main shaft 724, raised ribs may be disposed at positions directly opposite to the avoidance grooves 729 and on an inner wall surface of the ring-shaped protrusion portion 7242 so that the structural strength of the ring-shaped protrusion portion 7242 is locally enhanced, thereby ensuring stable support for the front bearing 711 and ensuring the accuracy of the front bearing 711.

Still referring to FIG. 37, a bearing mounting cavity 727 communicating with the first through hole 723 is provided inside the rear cover 721 of the gearbox 720, the bearing mounting cavity 727 includes a ring-shaped surface and an abutting surface, the abutting surface is perpendicular to the first direction a, the ring-shaped surface is disposed around the first direction a, and an end of the abutting surface facing away from the ring-shaped surface is connected to the inner wall surface of the first through hole 723. The main shaft lower bearing 726 is disposed in the bearing mounting cavity 727, a rear end surface of the main shaft lower bearing 726 abuts against the abutting surface, and an outer wall surface of the main shaft lower bearing 726 abuts against the ring-shaped surface.

Further optionally, still referring to FIG. 37, the whole rear cover 721 is in the shape of a multi-stage stepped column so that various positions of the rear cover 721 have substantially the same wall thickness, so as to reduce a space occupied by the rear cover 721 in the impact screwdriver and reduce a weight and manufacturing costs. To ensure the same structure of the rear cover 721, reinforcing bosses may be provided at a second step.

To further shorten the overall length of the impact screwdriver, part of the rear cover 721 of the gearbox 720 may be embedded into a stator of the electric motor 710, and the rear cover 721 in the shape of the multi-stage stepped column can effectively avoid a structure in the stator of the electric motor 710, thereby reducing a difficulty in embedding part of the rear cover 721 into the stator of the electric motor 710.

Example Three

This example provides an impact screwdriver which also includes an operation portion 700, a handheld portion 800, and a battery portion 900. The handheld portion 800 and the battery portion 900 are basically the same as those in example one, and a difference only lies in the operation portion 700.

Figure 41:
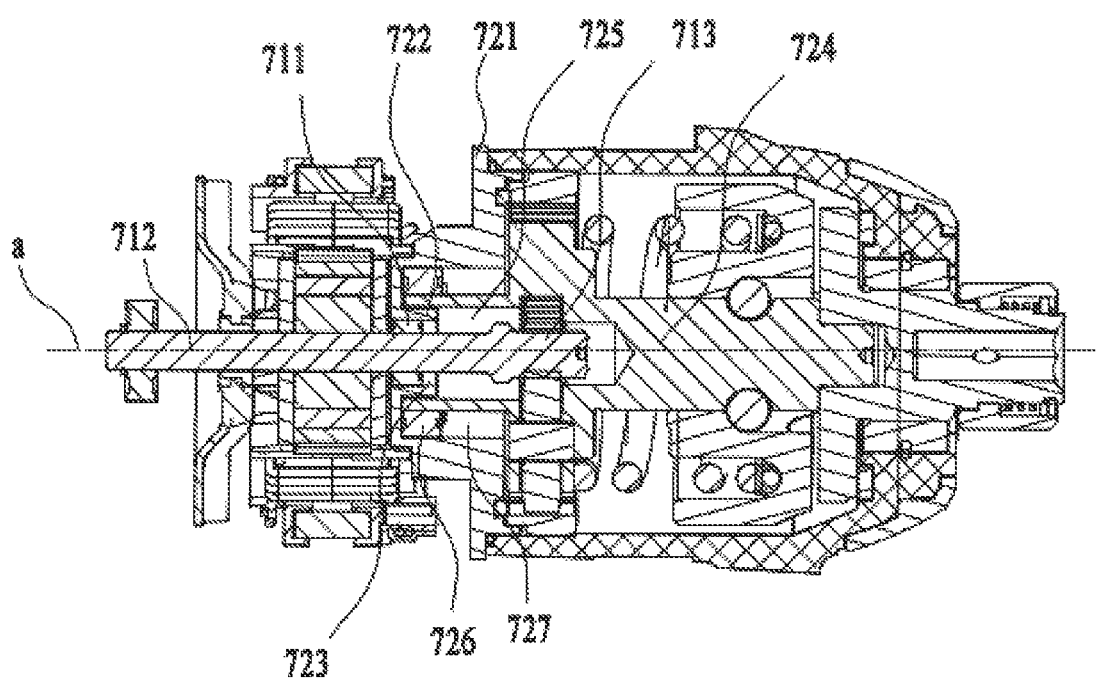
FIG. 41 is a sectional view of an electric motor and a gearbox of an impact screwdriver according to example three of the present application.
Figure 42:
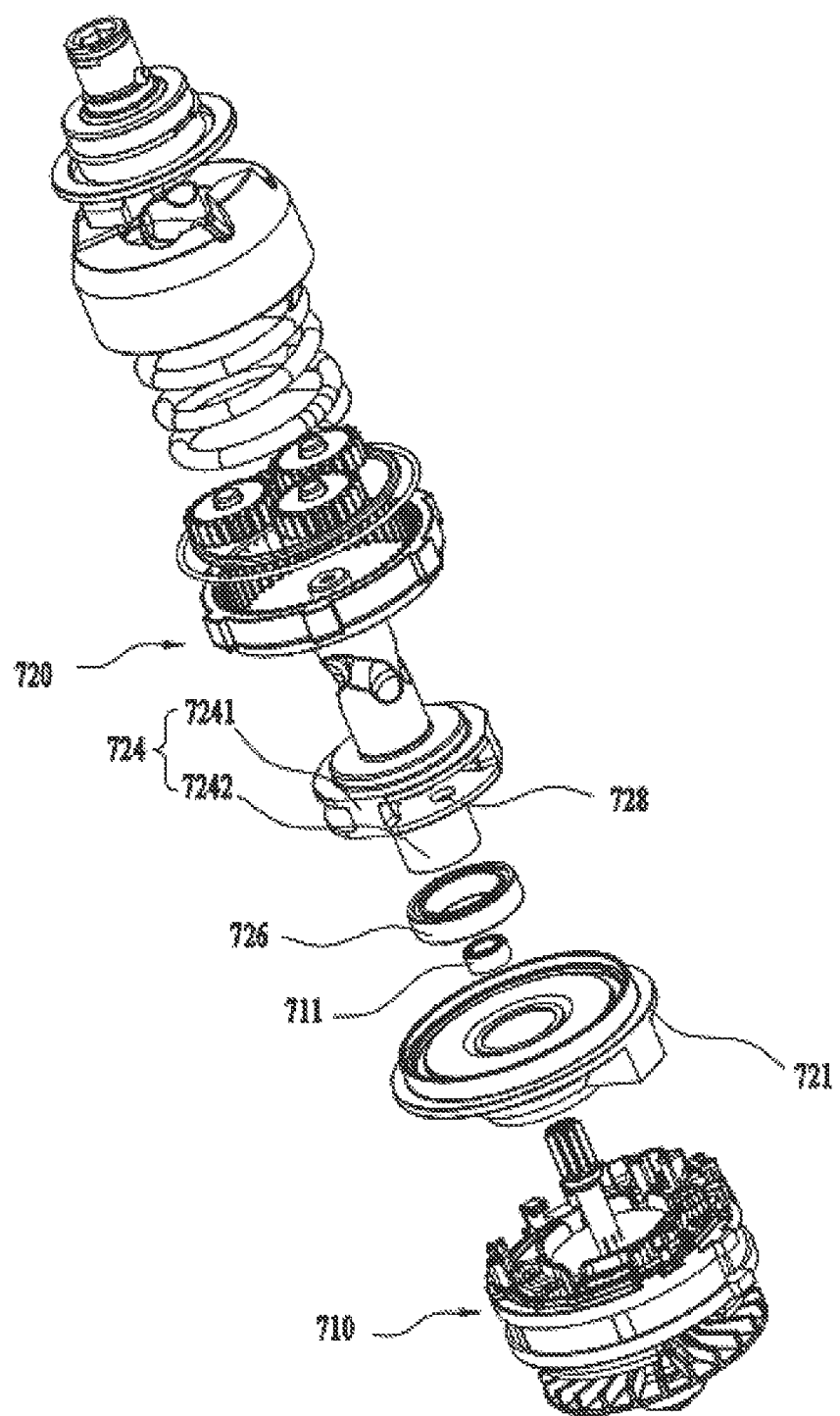
FIG. 42 is an exploded view of an electric motor and a gearbox of an impact screwdriver according to example three of the present application.

As shown in FIGS. 41 and 42, the operation portion 700 includes a housing, an electric motor 710, and a gearbox 720, where an accommodation space is formed in the housing, and both the electric motor 710 and the gearbox 720 are disposed in the housing. The electric motor 710 includes a motor shaft 712 extending along a first direction a in the accommodation space. A front bearing 711 is sleeved at a front end of the motor shaft 712. The motor shaft 712 has two end portions, where an end portion facing the gearbox 720 is referred to as the front end, and an end portion facing away from the gearbox 720 is referred to as a rear end.

The gearbox 720 is disposed parallel to the electric motor 710 along the first direction a. The gearbox 720 includes a rear cover 721, where a protruding structure 722 protrudes along the first direction a on the rear cover 721, and a first through hole 723 penetrates through the protruding structure 722 along the first direction a. The front end of the motor shaft 712 penetrates through the first through hole 723 and is disposed inside the gearbox 720. At least part of the front bearing 711 is disposed within the first through hole 723, and at least part of an outer wall surface of the front bearing 711 abuts against an inner wall surface of the first through hole 723.

In this example, the impact screwdriver is provided with the protruding structure 722 on the rear cover 721 of the gearbox 720, the first through hole 723 penetrates through the protruding structure 722, and the front bearing 711 of the electric motor 710 is accommodated and carried in the first through hole 723 so that the rear cover 721 of the gearbox 720 can also serve as a bearing mount of the electric motor 710. In this manner, the bearing mount does not need to be additionally disposed, thereby simplifying the structure of the whole impact screwdriver, shortening the overall length of the impact screwdriver, and improving a grip ability and user experience.

Figure 43:
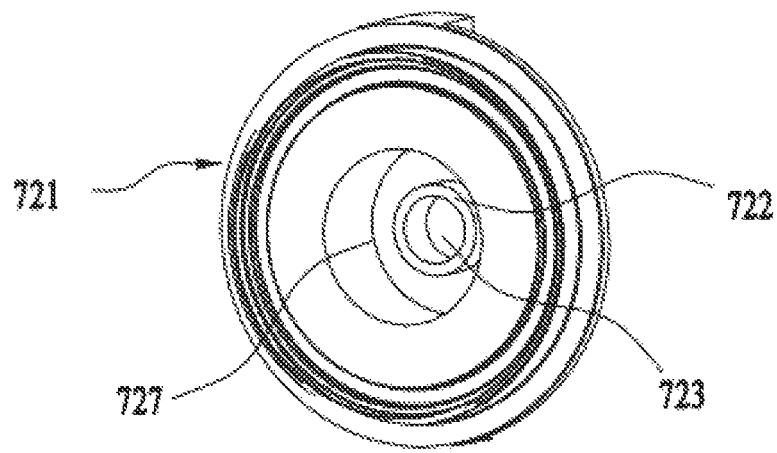
FIG. 43 is a structural view illustrating a rear cover of an impact screwdriver according to example three of the present application from a certain angle.
Figure 44:
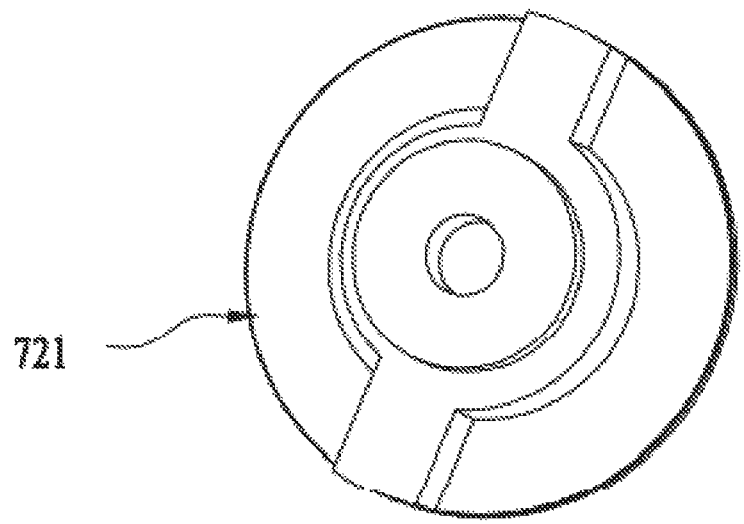
FIG. 44 is a structural view illustrating a rear cover of an impact screwdriver according to example three of the present application from another angle.

Specifically, in this example, as shown in FIGS. 43 and 44, the protruding structure 722 protrudes away from the electric motor 710 along the first direction a, and the length of the protruding structure 722 in the first direction a is greater than or equal to the length of the front bearing 711 in the first direction a. More specifically, still referring to FIGS. 41 and 43, the first through hole 723 is a through hole with an unchanged inner diameter. In this example, all of the front bearing 711 is disposed within the first through hole 723, and the rear cover 721 supports the front bearing 711 with relatively high stability.

Further, the gearbox 720 also includes a main shaft 724 extending along the first direction a, an end of the main shaft 724 facing the rear cover 721 is a rear end of the main shaft 724, the rear end of the main shaft 724 is provided with an assembly hole 725 along the first direction a, and the front end of the motor shaft 712 and the protruding structure 722 are both disposed within the assembly hole 725. In this manner, the overall length of the impact screwdriver can be further shortened.

It is to be noted that a planet gear mechanism is disposed in the main shaft 724, and the motor shaft 712 is drivingly connected to a sun gear of the planet gear mechanism to drive the sun gear to rotate. The planet gear mechanism further includes planet gears meshing with the sun gear. In this example, the number of planet gears is three, and three planet gears are uniformly distributed along a circumferential direction of the sun gear.

Optionally, still referring to FIGS. 41 and 42, the main shaft 724 includes a body portion 7241 and a ring-shaped protrusion portion 7242 connected in a step shape. The body portion 7241 is used for accommodating the planet gear mechanism, the whole body portion 7241 is in the shape of a circular platform and provided with the assembly hole 725 along the direction of a first axis a, and the assembly hole 725 extends towards the ring-shaped protrusion portion 7242 and penetrates through the ring-shaped protrusion portion 7242. Three planet gear accommodation cavities are provided inside the body portion 7241 along a direction around the assembly hole 725, and the three planet gear accommodation cavities penetrate through an outer wall surface of the body portion 7241 along a radial direction of the body portion 7241. The three planet gears are disposed in the three planet gear accommodation cavities separately, and a front end and a rear end of the body portion 7241 are each provided with three pin shaft holes 728. A pin shaft penetrates through front and rear corresponding pin shaft holes 728, and the planet gears are rotatably connected in the planet gear accommodation cavities through pin shafts. The planet gears protrude out of the planet gear accommodation cavities and mesh with a ring gear of the planet gear mechanism.

Further, the ring-shaped protrusion portion 7242 is in the shape of a circular platform and has a smaller dimension than the body portion 7241 so that an outer wall surface of the ring-shaped protrusion portion 7242 and a rear end surface of the body portion 7241 form a bearing mounting groove. Still referring to FIGS. 41 and 42, the gearbox 720 further includes a main shaft lower bearing 726 sleeved on the ring-shaped protrusion portion 7242 of the main shaft 724 and disposed within the bearing mounting groove. The main shaft lower bearing 726 can effectively and stably support the main shaft 724 so that the main shaft 724 can rotate stably.

To further reduce the overall length of the impact screwdriver, a projection of the main shaft lower bearing 726 on a plane parallel to the first direction a may at least partially overlap a projection of the front bearing 711 on the plane parallel to the first direction a. In this example, still referring to FIG. 41, the projection of the main shaft lower bearing 726 on the plane parallel to the first direction a partially overlaps the projection of the front bearing 711 on the plane parallel to the first direction a.

Optionally, still referring to FIG. 41, a bearing mounting cavity 727 communicating with the first through hole 723 is provided inside the rear cover 721 of the gearbox 720, the ring-shaped protrusion portion 7242 is disposed in the bearing mounting cavity 727, the bearing mounting cavity 727 includes a ring-shaped surface and an abutting surface, the abutting surface is perpendicular to the first direction a, the ring-shaped surface is disposed around the first direction a, and an end of the abutting surface facing away from the ring-shaped surface is connected to the inner wall surface of the first through hole 723. The main shaft lower bearing 726 is disposed in the bearing mounting cavity 727, a rear end surface of the main shaft lower bearing 726 abuts against the abutting surface, and an outer wall surface of the main shaft lower bearing 726 abuts against the ring-shaped surface.

Further optionally, the whole rear cover 721 is in the shape of a multi-stage stepped column so that various positions of the rear cover 721 have substantially the same wall thickness, so as to reduce a space occupied by the rear cover 721 in the impact screwdriver and reduce a weight and manufacturing costs. To ensure the same structure of the rear cover 721, reinforcing bosses may be provided at a second step.

To further shorten the overall length of the impact screwdriver, part of the rear cover 721 of the gearbox 720 may be embedded into a stator of the electric motor 710, and the rear cover 721 in the shape of the multi-stage stepped column can effectively avoid a structure in the stator of the electric motor 710, thereby reducing a difficulty in embedding part of the rear cover 721 into the stator of the electric motor 710.

It is to be noted that this example is applicable to the electric motor 710 with a relatively large diameter.

Additionally, the motor shaft 712 according to the preceding examples one to three may be a bare shaft to which a drive gear 713 needs to be additionally assembled, as shown in FIGS. 32 and 36, or an integral shaft formed with the drive gear 713, as shown in FIG. 41. The integral shaft is conducive to further shortening the overall length of the impact screwdriver.

What is claimed is:

1. A handheld power tool, comprising:
a housing comprising a barrel and a head housing;
a drive mechanism comprising an electric motor and a drive shaft, wherein the electric motor outputs power through the drive shaft;
a transmission mechanism comprising a gear assembly; and
an output mechanism comprising an output shaft for outputting power and at least partially disposed in the head housing,
wherein the transmission mechanism drivingly connects the drive mechanism to the output mechanism, the barrel is formed with a first accommodation cavity and a second accommodation cavity, the electric motor is at least partially mounted in the first accommodation cavity, and the gear assembly is at least partially mounted in the second accommodation cavity, and
wherein the gear assembly comprises an inner ring gear comprising a first meshing portion, a second meshing portion is formed in the barrel, and, when the gear assembly is mounted to the barrel, the first meshing portion meshes with the second meshing portion.

2. The handheld power tool according to claim 1, wherein a barrier is disposed in the barrel, the barrier and the barrel are integrally formed, and the first accommodation cavity and the second accommodation cavity exist on two sides of the barrier, separately.

3. The handheld power tool according to claim 2, wherein a plane where the barrier is located is perpendicular to the drive shaft, and a through hole is formed at a center of the barrier for the drive shaft to penetrate through.

4. The handheld power tool according to claim 3, wherein a first bearing mount is formed on a side of the barrier, and a front bearing of the electric motor is mounted to the first bearing mount.

5. The handheld power tool according to claim 4, wherein a second bearing mount is formed on another side of the barrier, and a bearing of the gear assembly is mounted to the second bearing mount.

6. The handheld power tool according to claim 1, wherein the inner ring gear and the barrel are integrally formed or mounted in a tight-fit manner.

7. The handheld power tool according to claim 1, wherein the barrel is formed with multiple mounting grooves for installing the inner ring gear.

8. The handheld power tool according to claim 1, wherein the electric motor comprises a stator and a rotor and is an inrunner.

9. The handheld power tool according to claim 8, wherein a side portion of the stator protrudes and extends to form a first end portion; and the barrel is formed with a rotation stopper opposite to the first end portion.

10. The handheld power tool according to claim 9, wherein the rotation stopper is formed with a space, and the first end portion at least partially extends into the space.

11. The handheld power tool according to claim 10, wherein the rotation stopper mates with the first end portion so that the stator and the barrel are incapable of being relatively displaced in a plane perpendicular to the output shaft.

12. The handheld power tool according to claim 1, wherein the barrel is provided with a plurality of air vents for circulation of an airflow.

13. The handheld power tool according to claim 1, wherein the transmission mechanism is installed on the barrel.

14. A handheld power tool, comprising:
a tool head comprising a barrel and a head housing;
a grip to which the tool head is fixedly connected; and
an output mechanism comprising an output shaft for outputting power and at least partially disposed in the head housing,
wherein the barrel and the head housing are in a threaded connection, and the head housing is formed with a locking structure for screwing the barrel and the head housing, and
wherein a gear assembly comprises an inner ring gear comprising a first meshing portion, a second meshing portion is formed in the barrel, and, when the gear assembly is mounted to the barrel, the first meshing portion meshes with the second meshing portion.

15. The handheld power tool according to claim 14, wherein the barrel is formed with an internal thread, the head housing is formed with an external thread, and the head housing partially extends into the barrel.

16. The handheld power tool according to claim 14, wherein the threaded connection is reinforced with a threadlocker.

* * * * *